United States Patent
Koeplinger et al.

(10) Patent No.: US 11,714,780 B2
(45) Date of Patent: *Aug. 1, 2023

(54) COMPILER FLOW LOGIC FOR RECONFIGURABLE ARCHITECTURES

(71) Applicant: SambaNova Systems, Inc., Palo Alto, CA (US)

(72) Inventors: David Alan Koeplinger, Menlo Park, CA (US); Raghu Prabhakar, San Jose, CA (US); Sumti Jairath, Santa Clara, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,128

(22) Filed: May 20, 2021

(65) Prior Publication Data
US 2021/0271630 A1 Sep. 2, 2021

Related U.S. Application Data

(63) Continuation of application No. 16/536,192, filed on Aug. 8, 2019, now Pat. No. 11,080,227.

(51) Int. Cl.
*G06F 15/78* (2006.01)
*G06F 16/901* (2019.01)
(Continued)

(52) U.S. Cl.
CPC ........ *G06F 15/7871* (2013.01); *G06F 12/023* (2013.01); *G06F 16/9024* (2019.01)

(58) Field of Classification Search
CPC ............... G06F 15/7871; G06F 12/023; G06F 16/9024; G06F 15/7867; G06F 8/41
See application file for complete search history.

(56) References Cited

U.S. PATENT DOCUMENTS

| 10,331,836 B1* | 6/2019 | Hosangadi | .............. G06F 30/30 |
| 2006/0026563 A1* | 2/2006 | Cabillic | .............. G06F 12/1081 |
| | | | 711/E12.067 |

(Continued)

OTHER PUBLICATIONS

"Plasticine: A Reconfigurable Architecture For Parallel Patterns", Prabhakar et al., ISCA '17, Jun. 24-28, 2017 (Year: 2017).*

*Primary Examiner* — Daxin Wu
(74) *Attorney, Agent, or Firm* — Flagship Patents; Sikander Khan; Bruce Young

(57) ABSTRACT

The technology disclosed partitions a dataflow graph of a high-level program into memory allocations and execution fragments. The memory allocations represent creation of logical memory spaces in on-processor and/or off-processor memories for data required to implement the dataflow graph. The execution fragments represent operations on the data. The technology disclosed designates the memory allocations to virtual memory units and the execution fragments to virtual compute units. The technology disclosed partitions the execution fragments into memory fragments and compute fragments, and assigns the memory fragments to the virtual memory units and the compute fragments to the virtual compute units. The technology disclosed then allocates the virtual memory units to physical memory units and the virtual compute units to physical compute units. It then places the physical memory units and the physical compute units onto positions in the array of configurable units and routes data and control networks between the placed positions.

23 Claims, 20 Drawing Sheets
(12 of 20 Drawing Sheet(s) Filed in Color)

(51) Int. Cl.
*G06F 8/41* (2018.01)
*G06F 12/02* (2006.01)

(56) References Cited

U.S. PATENT DOCUMENTS

2016/0019286 A1* 1/2016 Bach .................... G06F 16/119
                                                      707/603
2018/0189231 A1* 7/2018 Fleming, Jr. ........ G06F 12/0862
2019/0102179 A1* 4/2019 Fleming ................ G06F 9/3017

* cited by examiner

202

```
input = torch.randn([4, 3, 224, 224], torch.fp32)
weights = torch.randn([64, 3, 7, 7], torch.fp32)
linear_weights = torch.randn([64, 1000], torch.fp32)
conv = torch.nn.conv2d(input, weights)
mean = np.mean(conv)
var = np.var(conv)
epsilon = 1e-27
bn = (conv - mean) / np.sqrt(var + epsilon)
relu = np.clip(bn, 0, np.inf)
avgpool_out = torch.nn.AvgPool2d([112, 112])
avgpool = avgpool_out.view(4, 64)
linear = torch.mm(avgpool, linear_weights)
```

FIG. 5

224 — Memory Allocations
222 — Execution Fragments

// Conv
// Allocation 1 — 701
Input        = SRAM4[Float](4, 64, 112, 112)
// Allocation 2 — 702
Conv_weights = SRAM4[Float](64, 3, 7, 7)
// Allocation 3 — 703
Conv_out     = SRAM4[Float](4, 3, 224, 224)

Foreach(4 by 1, 3 by 1, 224 by 1, 224 by 1){(b,co,ho,wo) =>
  y = 0
  Foreach(64 by 1, 7 by 1, 7 by 1){ (ci, hk, wk) =>
    // Fragment 1 — 704
    y += Input(b, ci, ho + hk, wo + wk) * Conv_weights(ci, co, hk, wk)
  }
  // Fragment 2 — 705
  Conv_out(b,co,wo,ho) = y
}

// Batchnorm
// Allocation 4 — 706
BN_out  = SRAM4[Float](4, 64, 112, 112)
// Allocation 5 — 707
scale   = SRAM1[Float](64)
// Allocation 6 — 708
bias    = SRAM1[Float](64)
epsilon = ArgIn[Float]

Foreach(64 by 1){c =>
  mean = 0
  Foreach(4 by 1, 112 by 1, 112 by 1){(b, h, w) =>
    // Fragment 3 — 709
    mean += Conv_out(b, c, h, w)  — 1302
  }
  // Fragment 4 — 710
  mean = mean / (4 * 112 * 112)  — 1206

FIG. 7A

```
                                            224 ┐  Memory Allocations
                                            222 ┐  Execution Fragments
    var = 0
    Foreach(4 by 1, 112 by 1, 112 by 1){(b, h, w) =>
        // Fragment 5  ┌─ 711
        var += (Conv_out(b, c, h, w) - mean) ** 2  ┌─ 1304
    }
    // Fragment 6  ┌─ 712
    var = var / (4 * 112 * 112)
    div = sqrt(var + epsilon)  ┌─ 1207

Foreach(4 by 1, 112 by 1, 112 by 1){(b, h, w) =>
        // Fragment 7  ┌─ 713
        BN_out(b,c,h,w) = (Conv_out(b,c,h,w) - mean)/div * scale(c) + bias(c)
    }
}

// ReLU
// Allocation 7  ┌─ 714
ReLU_out = SRAM4[Float](4, 64, 112, 112)
Foreach(4 by 1, 64 by 1, 112 by 1, 112 by 1){(b,c,h,w) =>
    // Fragment 8  ┌─ 715
    ReLU_out(b,c,h,w) = max(BN_out(b,c,h,w), 0)
}

// Average Pool
// Allocation 8  ┌─ 716
AvgPool_out = SRAM4[Float](4, 64)
Foreach(4 by 1, 64 by 1){(b,c) =>
    sum = 0
    Foreach(112 by 1, 112 by 1) {(hk,wk) =>
        // Fragment 9  ┌─ 717
        hi = Hstride * ho + hk
        wi = Wstride * wo + wk
        sum += ReLU_out(b,c,hi,wi)
    }
    // Fragment 10  ┌─ 718
    AvgPool_out(b,c) = sum / (112 * 112)
}
```

FIG. 7B

224 ⇁ Memory Allocations

222 ⇁ Execution Fragments

```
// Linear
// Allocation 9         719
Linear_W = SRAM2[Float](64, 1000)
// Allocation 10        720
Linear_out = SRAM2[Float](4, 1000)
Foreach(4 by 1) { i =>
   Foreach(1000 by 1) { j =>
      Foreach(64 by 1) { k =>
         // Fragment 11     721
         Linear_out(i,j) += AvgPool_out(i,k) * Linear_W(k,j)
      }
   }
}
```

FIG. 7C

```
// Fragment 7                                        ⟵ 713
BN_out(b,c,h,w) = (Conv_out(b,c,h,w) - mean)/div * scale(c) + bias(c)

// Memory Fragment 7a       ⟵ 1201
mf7a = Conv_out(b,c,h,w)

// Memory Fragment 7b       ⟵ 1202
mf7b = scale(c)

// Memory Fragment 7c       ⟵ 1203
mf7c = bias(c)

// Compute Fragment 7d      ⟵ 1204
cf7d = (mf7a - cf4)/cf6 * mf7b + mf7c

// Memory Fragment 7e       ⟵ 1205
mf7e: BN_out(b,c,h,w) = cf7d
```

COMPILER FLOW LOGIC FOR RECONFIGURABLE ARCHITECTURES

PRIORITY APPLICATION

This application is a continuation of U.S. patent application Ser. No. 16/536,192, entitled "COMPILER FLOW LOGIC FOR RECONFIGURABLE ARCHITECTURES," filed Aug. 8, 2019. The non-provisional application is incorporated by reference for all purposes.

FIELD OF THE TECHNOLOGY DISCLOSED

The present technology relates to compiler flow of reconfigurable architectures, and can be particularly applied to compiler flow logic for coarse-grain reconfigurable architectures and other distributed execution systems.

INCORPORATIONS

The following are incorporated by reference for all purposes as if fully set forth herein:

U.S. Nonprovisional patent application Ser. No. 16/239,252, filed Jan. 3, 2019, entitled, "VIRTUALIZATION OF A RECONFIGURABLE DATA PROCESSOR";

U.S. Nonprovisional patent application Ser. No. 16/197,826, filed Nov. 21, 2018, entitled, "CONFIGURATION LOAD OF A RECONFIGURABLE DATA PROCESSOR";

U.S. Nonprovisional patent application Ser. No. 16/198,086, filed Nov. 21, 2018, entitled, "CONFIGURATION UNLOAD OF A RECONFIGURABLE DATA PROCESSOR";

U.S. Nonprovisional patent application Ser. No. 16/260,548, filed Jan. 29, 2019, entitled, "MATRIX NORMAL/TRANSPOSE READ AND A RECONFIGURABLE DATA PROCESSOR INCLUDING SAME"; and U.S. Nonprovisional patent application Ser. No. 16/407,675, filed May 9, 2019, entitled, "CONTROL FLOW BARRIER AND RECONFIGURABLE DATA PROCESSOR,".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including field programmable gate arrays (FPGAs), can be configured to implement a variety of functions more efficiently or faster than might be achieved using a general purpose processor executing a computer program. So-called coarse-grain reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar et al., "Plasticine: A Reconfigurable Architecture for Parallel Patterns," ISCA '17, Jun. 24-28, 2017, Toronto, ON, Canada.

CGRAs are an extremely attractive platform when performance, power, or energy efficiency are paramount. A CGRA is a composition of coarse-grained reconfigurable compute and memory elements that are interconnected together in a certain topology using a reconfigurable interconnect fabric. It is referred to as coarse-grained reconfigurable because the reconfigurable components in the architecture operate at a coarser granularity such as instructions, words, and vectors of words, as opposed to fine-grained, bit-level granularity commonly found in architectures such as FPGAs. The programmable data and control paths in CGRAs make them a natural fit to exploit nested parallelism in applications, by connecting the reconfigurable compute and memory components into customized, deeply nested, and hierarchical pipelines.

Modern applications often have several levels of nested loop levels, and contain parallelism at multiple levels of nesting. For such deeply-nested loops, traditional loop pipelining methods, which focus only on bodies of the innermost loops, often exploits insufficient parallelism and results poor hardware utilization, resulting in poor performance, power, or energy efficiency.

Efficient compiler technology enables programmers to describe applications in a high-level language, while most of the optimizations happen automatically. Compilers have been proposed that can automatically translate high-level language to a hierarchy of pipelines and state machines on FPGAs. See Koeplinger et al., "Spatial: A Language And Compiler For Application Accelerators," *Proceedings Of The 39th ACM SIGPLAN Conference On Programming Language Design And Implementation* (PLDI), 2018.

Achieving the promised performance, power, and energy efficiency critically hinges on the compiler technology. A CGRA compiler is much more complex than a regular compiler because it has to (i) perform code analysis to extract task, data, and pipelined parallelism at multiple levels of nesting, (ii) partition and schedule operations in both space and time on the reconfigurable elements, (iii) place the operations onto the reconfigurable elements, and (iv) route the data and control dependencies between the reconfigurable elements.

Therefore, an opportunity arises to efficiently map nested loops onto the reconfigurable elements of CGRAs. Improved parallelization and hardware utilization may result.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 5 shows an example of a high-level program for a single layer ResNet block.

FIGS. 7A, 7B, and 7C illustrate one example of partitioning the dataflow graph into memory allocations and execution fragments.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Reconfigurable Data Processor & Compiler

Figure 1:
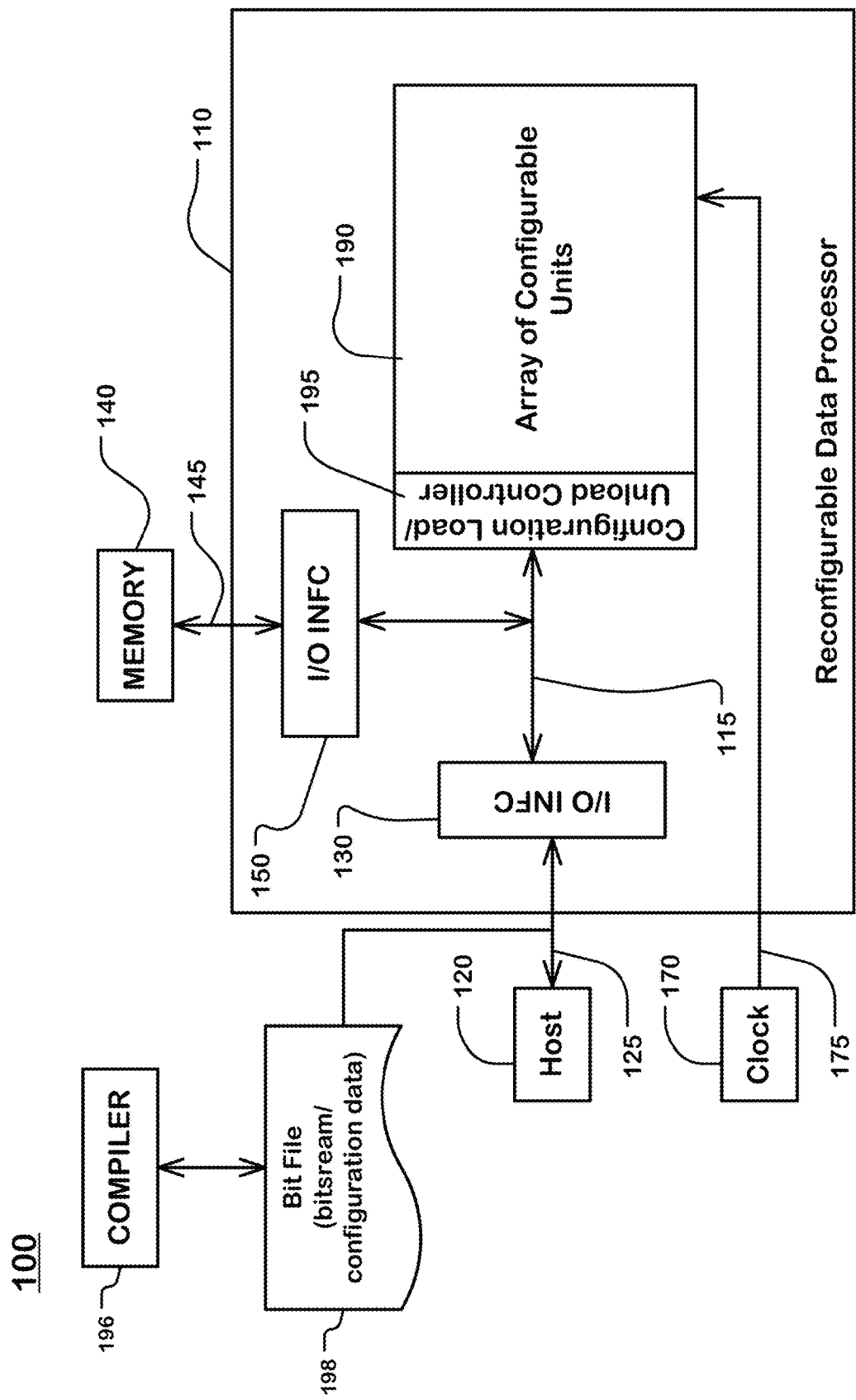
FIG. 1 is a system diagram illustrating a system including a compiler, a host, a memory, and a reconfigurable data processor with an array of configurable units.

FIG. 1 is a system diagram illustrating a system including a compiler 196, a host 120, a memory 140, and a reconfigurable data processor 110. As shown in the example of FIG. 1, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources, or may be implemented using shared logic and data path resources as suits a particular embodiment. In some embodiments, a system may include only a configuration load controller of the types described herein. In some embodiments, a system may include only a configuration unload controller of the types described herein.

Configuration of the array 190 of configurable units involves compilation of a configuration description by the compiler 196 to produce a configuration file 198, referred to sometimes as a bitstream or bit file, and distributing the configuration file 198 to the configurable units on the array 190. In one embodiment, the compiler 196 provides translations from application programs to bit file.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can comprise one chunk, or other amounts of data as suits a particular embodiment. Procedures are described herein using sub-files consisting of one chunk of data each. Of course, the technology can be configured to distribute sub-files of different sizes, including sub-files that may comprise two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The host 120 connects to the interface 130 via the bus system 125. The memory 140 connects to the interface 150 via the bus system 145. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces.

Figure 2:
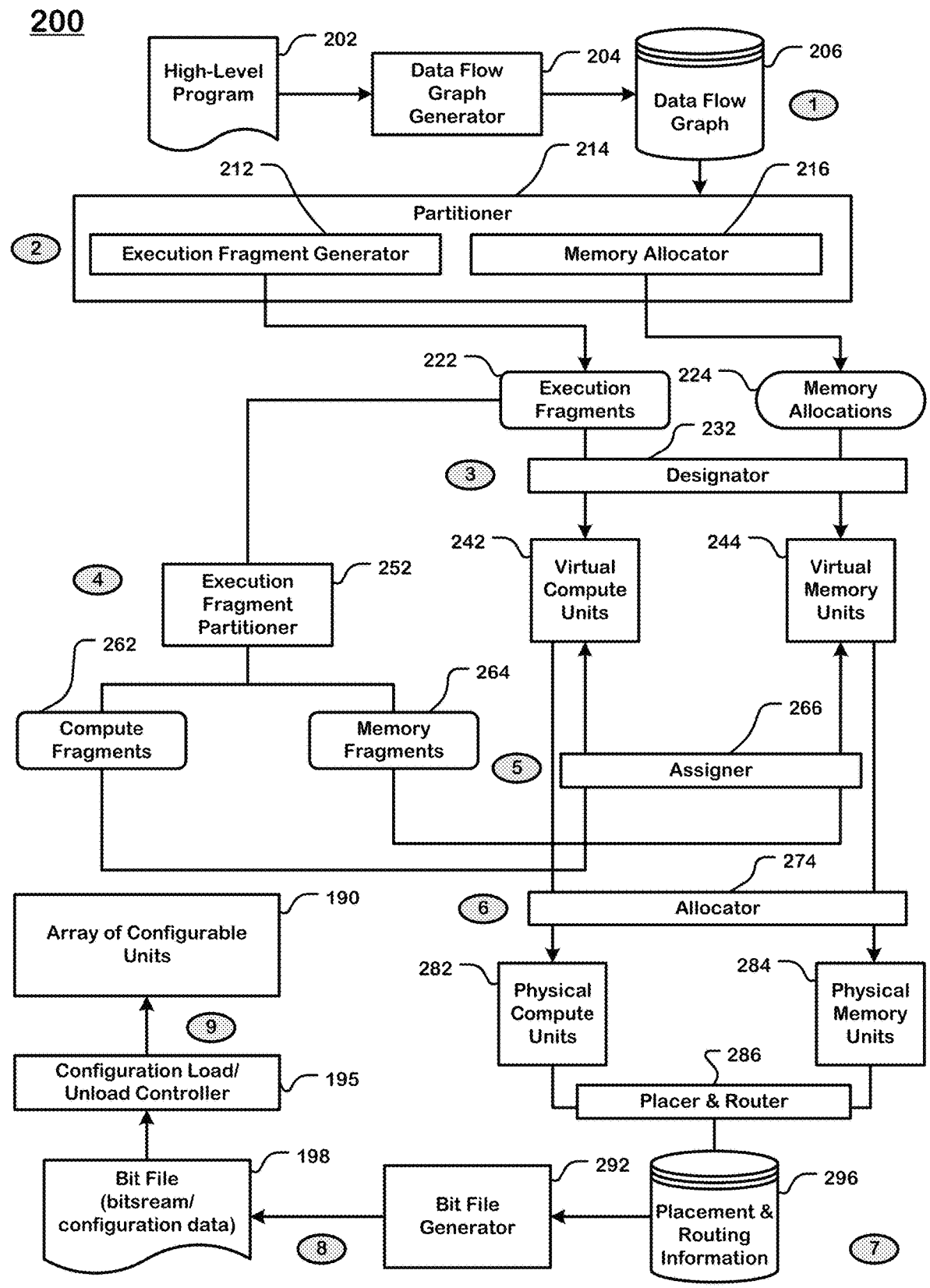
FIG. 2 is a block diagram of one implementation of transforming a high-level program for mapping onto the reconfigurable data processor.

FIG. 2 is a block diagram 200 of one implementation of transforming a high-level program for mapping onto the reconfigurable data processor 100. Mapping of an application onto the reconfigurable data processor 100 involves mapping of arithmetic and logical operations to reconfigurable units of the reconfigurable data processor 100. The design is specified at a high level of abstraction using machine learning frameworks like PyTorch, ONNX, and Tensorflow, or high-level languages such as C, C++, Java, Python, or Spatial. See, Koeplinger et al., "Spatial: A Language And Compiler For Application Accelerators," *Proceedings Of The 39th ACM SIGPLAN Conference On Programming Language Design And Implementation* (PLDI), Proceedings of the 43rd International Symposium on Computer Architecture, 2018. The proposed technique is used to automatically generate the configuration bits structure that implements the behavior described at the high-level of abstraction.

Compiler Flow

High-level program 202 is an application program or source code written in programming languages such as (but not restricted to) C, C++, Java, Python, or Spatial. For example, the high-level program 202 can implement convolutional neural network (CNN) processing with several layers of varying sizes and data type such that each layer comprises several nested loops with different properties. For example, the high-level program 202 can involve memory operations to access the inputs and weights and floating point operations to perform matrix multiplications. As another example, the high-level program 202 can include nested loops with high iteration count and loop bodies that load and multiply the input values from a preceding layer with the weights of a succeeding layer to produce the output of the succeeding layer. The high-level program 202 has loop-level parallelism of the outermost loop body that can be exploited using coarse-grained pipelining. It has instruction-level parallelism of the innermost loop body that can be similarly exploited using loop unrolling, SIMD vectorization, and pipelining.

Regarding loops, loops directly nested in a loop body are termed the child loops of the outer parent loop. A loop is called an innermost loop if it does not have any children, i.e., there are not any nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

At action 1, a dataflow graph generator 204 generates a dataflow graph 206 of the high-level program 202. The compilation transforms the input behavioral description into an intermediate representation. This first step may include various code optimizations such as false data dependency elimination, dead-code elimination, and constant folding. The intermediate representation produced by the compilation exhibits the data and control dependencies between the operations.

Nodes in the dataflow graph 206 represent control structures, data operations, and memory allocations, while edges represent data and effect dependencies. Each loop in the program is represented as a "controller" in the intermediate representation. The dataflow graph 206 supports branches, loops, function calls, and other variations of control dependencies. Once the dataflow graph 206 is built, additional analyses or optimizations can be performed focusing on loop transformations including loop unrolling, loop pipelining, loop fission/fusion, and loop tiling.

At action 2, a partitioner 214, partitions the dataflow graph 206 into memory allocations 224 and execution fragments 222. Regarding execution fragments 222, they represent operations on the data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Similarly, different ones of the execution fragments 222 can contain different amounts of computation. Execution fragments 222 can represent parallel patterns or portions of parallel patterns. Also, the execution fragments 222 are executable asynchronously.

In one embodiment, the partitioner 214 comprises a memory allocator 216 that generates the memory allocations 224 and an execution fragment generator 212 that generates the execution fragments 222. In one embodiment, the partitioning of the dataflow graph 206 into the execution fragments 222 further includes treating calculations within at least one innermost loop of a nested loop of the dataflow graph 206 as a separate execution fragment. In another embodiment, the partitioning of the dataflow graph 206 into the execution fragments 222 further includes treating calculations of an outer loop around the innermost loop of the dataflow graph 206 as a separate execution fragment. In the case of imperfectly nested loops, operations within a loop body up to the beginning of a nested loop within that loop body are grouped together as a separate execution fragment.

Regarding memory allocations 224, they represent the creation of logical memory spaces in on-chip and/or off-chip memories for data required to implement the dataflow graph 206. Memory allocations 224 define the type and the number of hardware resources (functional units, storage, or connectivity components). Main memory, abbreviated as DRAM, is an example of off-chip memory for which the memory allocations 224 are made. Scratchpad memory, or SRAM, is an example of on-chip memory for which the memory allocations 224 are made. Other memory types for which the memory allocations 224 can be made for various commonly occurring access patterns and layouts found in applications. Examples of such memory types include read-only lookup-tables (LUTs), fixed size queues (FIFOs), and register files.

At action 3, a designator 232, designates the memory allocations 224 to virtual memory units 244 and designates the execution fragments 222 to virtual compute units 242.

At action 4, an execution fragment partitioner 252, partitions the execution fragments 222 into memory fragments 264 and compute fragments 262. Each memory fragment includes address calculation leading up to a memory access. The compute fragment comprises all other operations in the parent execution fragment. In one embodiment, each execution fragment is broken up into a plurality of memory fragments and exactly one compute fragment. The compiler 196 performs the partitioning using reverse dataflow analysis such that inputs to an address used in a memory access are recursively flagged until the compiler 196 reaches either constant values or (bound) loop/pattern iterators. A single execution fragment may produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments 264 of the execution fragments 222 are configured to index into data structures. At least one of the memory fragments 264 indexes into a data structure in the logical memory spaces of one of the memory allocations 224. Each compute and memory fragment preserves information about all loops whose loop bodies directly contain the operations in the corresponding execution fragment. In one embodiment, this corresponds to replicating the calculation of the loop iterators of each loop into each compute and memory fragment. This replication allows each fragment to preserve the same iterative behavior as the original program while also allowing distributed calculation of loop iterators.

At action 5, an assigner 266, assigns the memory fragments 264 to the virtual memory units 244 and assigns the compute fragments 262 to the virtual compute units 242. The virtual memory units 244 implement the corresponding memory fragments 264. The virtual compute units 242 implement the corresponding compute fragments 262.

Each memory fragment is mapped operation-wise to the virtual memory unit corresponding to the memory being accessed. Each operation is lowered to its corresponding configuration intermediate representation (IR) for that virtual memory unit. Each compute fragment is mapped operation-wise to a newly allocated virtual compute unit. Each operation is lowered to its corresponding configuration intermediate representation (IR) for that virtual compute unit.

At action 6, an allocator 274, allocates the virtual memory units 244 to physical memory units 284 and allocates the virtual compute units 242 to physical compute units 282.

At action 7, a placer and router 286, places the physical memory units 284 and the physical compute units 282 onto positions in the array 100 of configurable units and routes data and control networks between the placed positions. In one embodiment, this further includes allocating physical resources such as counters and registers within each physical memory and compute unit.

At action 8, a bit file generator 292, accesses placement and routing information 296 produced by the placer and router 286 and generates the bit file 198 with configuration data for the placed positions and the routed data and control networks. In one embodiment, this includes assigning coordinates and communication resources of the physical memory and compute units by placing and routing units onto the array 100 of configurable units while maximizing bandwidth and minimizing latency.

At action 9, the configuration load/unload controller 195 loads the bit file 198 onto an instance of the array 100 of configurable units and causes the array 100 of configurable units to implement the dataflow graph 206.

Splitting

Figure 3:
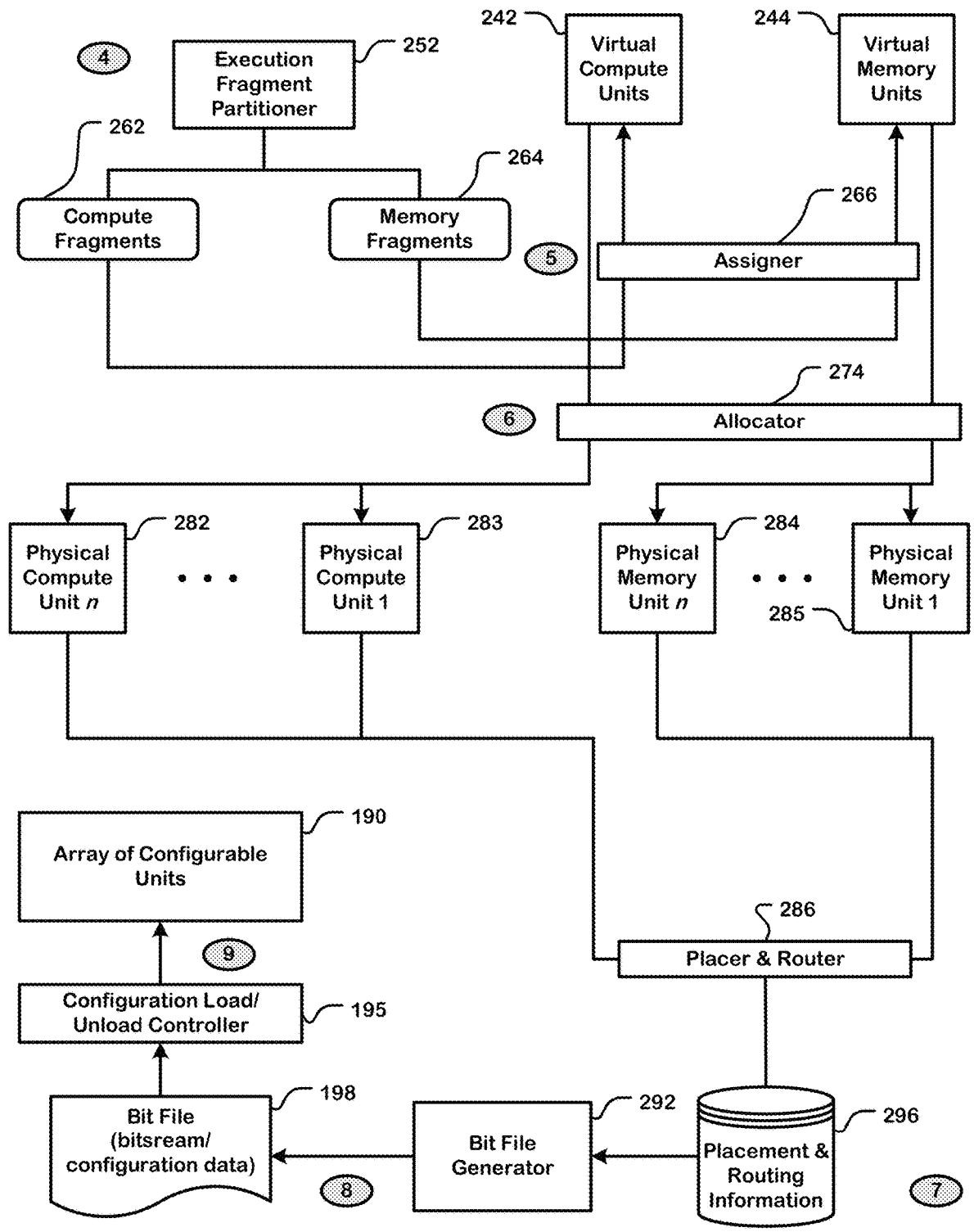
FIG. 3 is a block diagram of one implementation of allocating the virtual memory units to multiple physical memory units and allocating the virtual compute units to multiple physical compute units.

FIG. 3 is a block diagram 300 of one implementation of allocating the virtual memory units 244 to multiple physical memory units 284, 285 and allocating the virtual compute units 242 to multiple physical compute units 282, 283. This is done at action 6 in FIG. 3 by the allocator 274. In one embodiment, the allocation satisfies hardware constraints of the multiple physical memory units 284, 285 and the multiple physical compute units 282, 283.

In one embodiment, the allocating depends, at least in part, on a number of inputs accepted by a particular physical compute unit. In one embodiment, as a first step, in each virtual memory and compute unit, operations are removed until the virtual memory and compute unit is physically realizable. In one embodiment, as a second step, the removed operations are grouped into a separate, new virtual memory and compute unit. In one embodiment, these two steps are repeated until all virtual memory and compute units are physically realizable. In one embodiment, the compiler 196 then adds data and control communication channels to the IR between the virtual memory and compute units based on dependencies in the original virtual memory and compute unit.

In the context of this application, "physically realizable" is modeled using analysis with target architecture parameters. In one embodiment, the parameters include a capacity of on-chip SRAM available in a physical memory unit, a number of arithmetic logic unit (ALU) stages, a number of registers per stage, capabilities of each ALU stage, connections available between ALUs and the registers, and connections available between the registers. In one embodiment, the order in which the operations are removed can vary and is based on heuristics whose objective function is to minimize the final number of physically realizable units. In other embodiments, heuristics may be applied with a different objective function to minimize the total execution time, which could increase the number of physically realizable units.

At action 7, the placer and router 286, places the multiple physical memory units 284, 285 and the multiple physical compute units 282, 283 onto positions in the array 100 of configurable units and routes data and control networks between the placed positions.

At action 8, the bit file generator 292, accesses the placement and routing information 296 produced by the placer and router 286 and generates the bit file 198 with configuration data for the placed positions and the routed data and control networks.

At action 9, the configuration load/unload controller 195 loads the bit file 198 onto an instance of the array 100 of configurable units and causes the array 100 of configurable units to implement the dataflow graph 206.

Fusion

Figure 4:
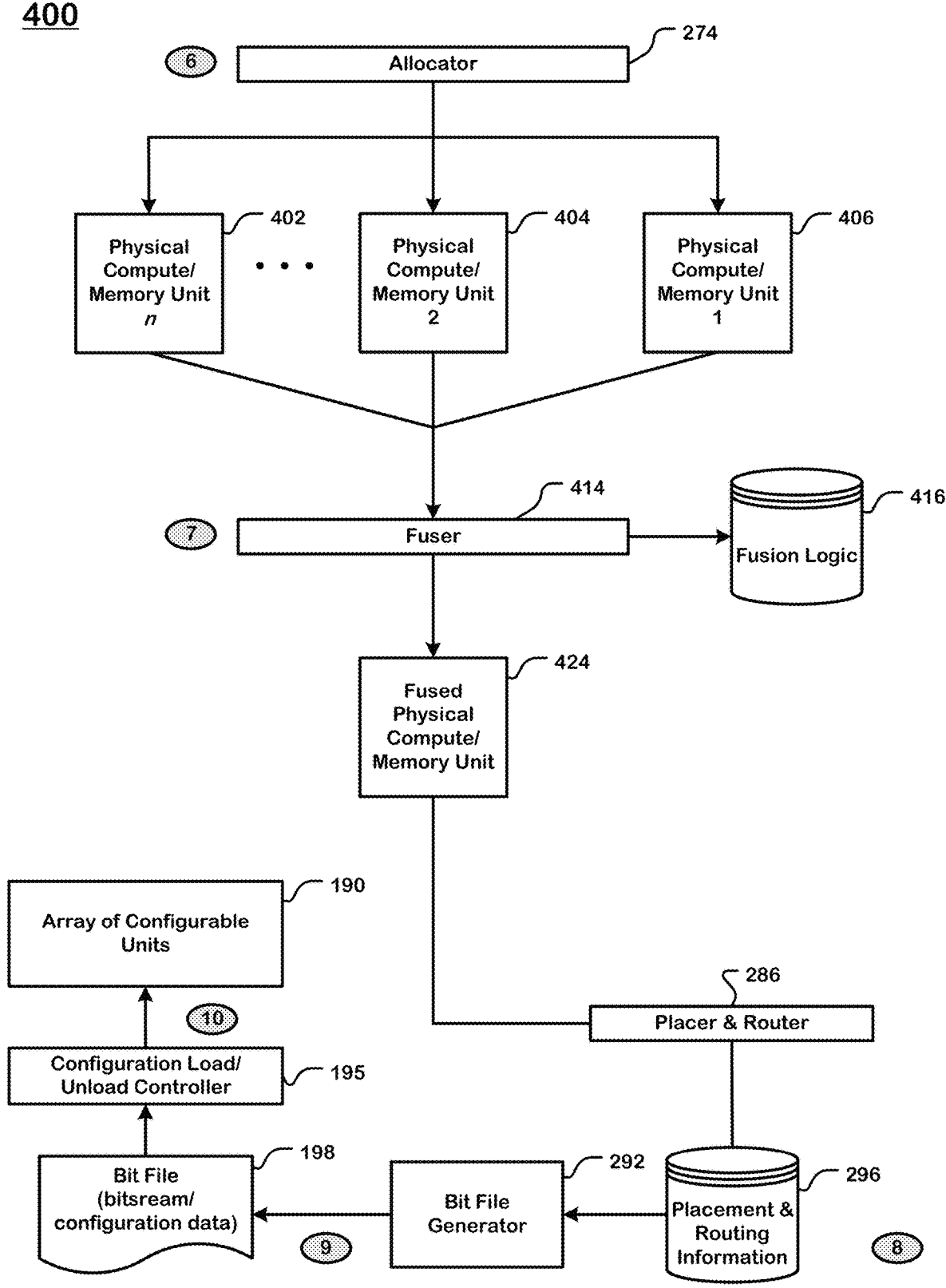
FIG. 4 is a block diagram of one implementation of fusing the multiple physical memory units into a single physical memory unit and fusing the multiple physical compute units into a single physical compute unit.

FIG. 4 is a block diagram 400 of one implementation of fusing the multiple physical memory units 402, 404, 406 into a single physical memory unit 424 and fusing the multiple physical compute units 402, 404, 406 into a single physical compute unit 424. This is done at action 7 in FIG. 4 by fuser 424 based on fusion logic 416. The goal of fusion is to reduce resource wastage by better packing operations into physical memory and compute units. In one embodiment, termed as "fusion in space," two or more physical memory or compute units with underutilized resources can be combined into a single memory or compute unit with a higher resource utilization for efficiency, as long as the resulting resource utilization is still physically realizable. In another embodiment, termed as "fusion in time," two or more physical memory or compute units can be combined by scheduling them to execute sequentially as separate execution contexts within a single, new physical memory or compute unit. In still other embodiments, a combination of fusion rules in both in space and time may be employed if such a combination of optimizations is deemed profitable by the compilation flow. The fusion rules may be determined using heuristics, search algorithms, or other algorithmic optimization techniques.

In one embodiment, the fusing depends, at least in part, on a capacity of on-chip SRAM available in a physical memory unit, and a number of ALU stages within the single physical compute unit. In one embodiment, the fusion in space includes executing multiple operations on the single physical compute unit 424 that would otherwise execute on separate physical compute units 402, 404, 406 at different clock cycles. In one embodiment, the fusion in time includes sequentially executing the multiple operations on the single physical compute unit 424 as separate execution contexts. In one embodiment, a plurality of operations from the dataflow graph 206 grouped onto a particular physical compute unit are mapped onto resources within the particular physical compute unit. In other embodiments, heuristics are used that look for the tradeoff between the number of required physical memory and compute units and the achieved performance.

At action 8, the placer and router 286, places the single physical memory unit 424 and the single physical compute unit 424 onto positions in the array 100 of configurable units and routes data and control networks between the placed positions.

At action 9, the bit file generator 292, accesses the placement and routing information 296 produced by the placer and router 286 and generates the bit file 198 with configuration data for the placed positions and the routed data and control networks.

At action 10, the configuration load/unload controller 195 loads the bit file 198 onto an instance of the array 100 of configurable units and causes the array 100 of configurable units to implement the dataflow graph 206.

In some embodiments, the compiler flow logic discussed with reference to FIGS. 2, 3, and 4 is implemented by the compiler 196.

ResNet Example

High-Level Program

FIG. 5 shows an example of the high-level program 202 in PyTorch. This example implements a residual neural network (ResNet) block, which is a commonly used type of Convolutional Neural Network (CNN) popularly used for automatic image classification. The ResNet architecture contains several layers of convolution operations, where each layer performs several convolution operations on the output of the preceding layer and the weight filters of the current layer. The ResNet architecture also contains skip connections that connect outputs of some layers to the inputs of layers that are much further in the network, "skipping" two or three layers in between. ResNet models also contain nonlinear functions such as ReLU and batch normalization in between. Batch normalization is a method for accelerating deep network training by making data standardization an integral part of the network architecture.

Dataflow Graph

Figure 6:
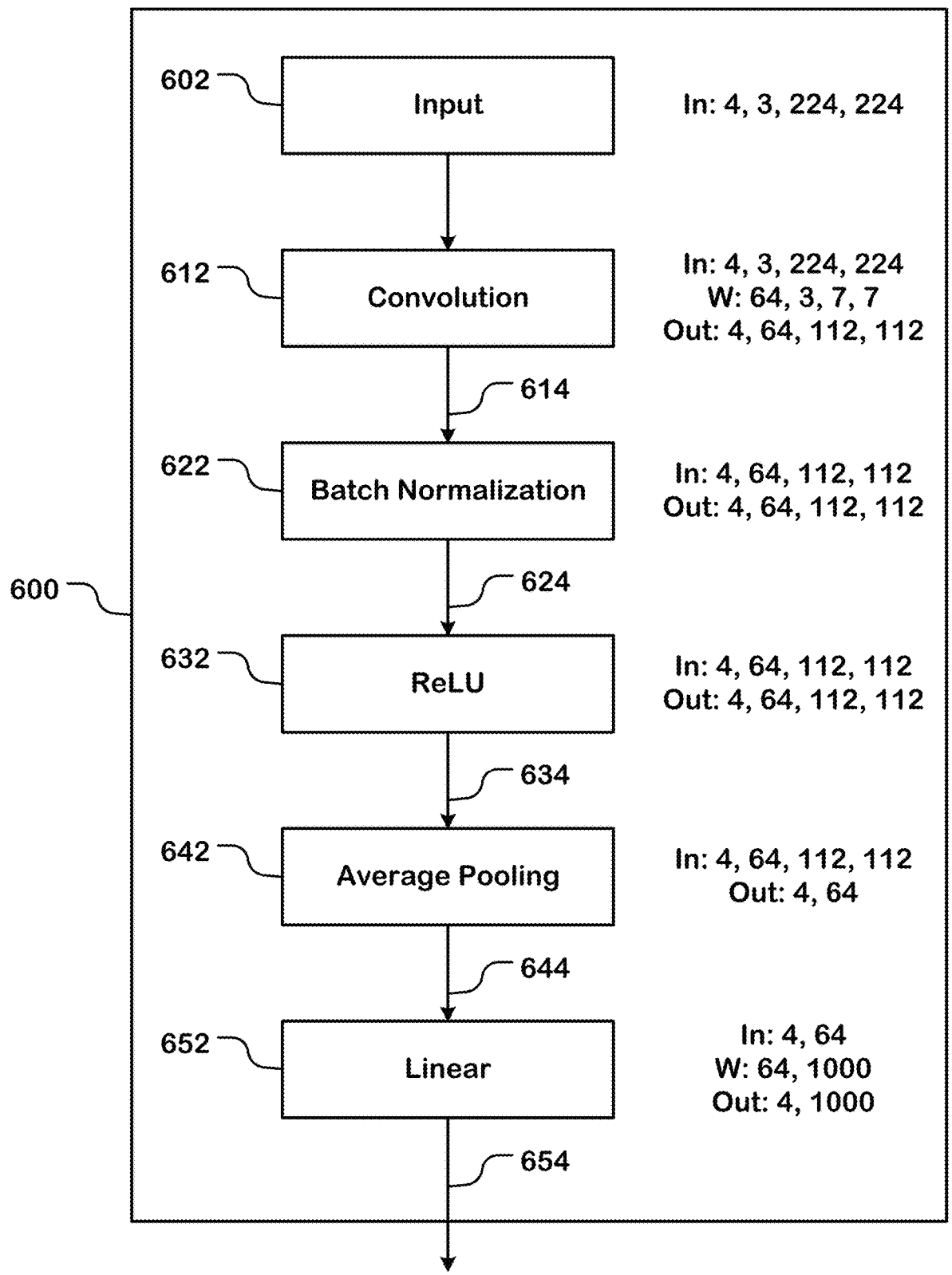
FIG. 6 depicts one example of the dataflow graph of the ResNet block.

FIG. 6 depicts one example of the dataflow graph 206 of the ResNet block 600. This example performs convolution 612 on input 602 and produces output 614. Batch normalization 622 is performed on output 614 to produce output 624. The batch normalized output 624 is then linearized between zero and the maximum positive values by the ReLU activation 632 to produce the ReLU activated output 634. Average pooling 642 is performed on ReLU activated output 634 to produce the average pooled output 644. The average pooled output 644 is then fed as input to a linear layer 652 (e.g. a fully-connected network) to produce a final output 654 of the ResNet block 600. The linear layer 652 has 1000 neurons (weights).

Dimensionality of the input 602 is 4×3×224×224, where 4 is the batch size, 3 is the number of input channels (e.g. RGB image channels), 224 is the input width (e.g. number of pixel columns in an image), and 224 is the input height (e.g. number of pixel widths in an image). Dimensionality of the convolution 612 is 64×3×7×7, where 64 is the number of convolution filters, 3 is the number of kernels in each convolution filter, 7 is the kernel width (e.g. number of weight columns in a kernel), and 7 is the kernel height (e.g. number of weight rows in a kernel). Dimensionality of the output 614 is 4×64×112×112, where 4 is the batch channel, 64 is the number of output channels, 112 is the output width (e.g. number of feature columns in a feature map), and 112 is the output height (e.g. number of feature rows in a feature map). Dimensionality of the final output 654 is 4×100, where 4 is the batch channel and 1000 is the number of output channels.

Intermediate Representation & Partitioning

FIGS. 7A, 7B, 7C show example implementations of a subset of the ResNet architecture as the high-level program 202, which is represented internally as the dataflow graph 206. In one embodiment, the high-level program could be written in the Spatial high-level language. See, D. Koeplinger et al., "Spatial: A Language And Compiler For Application Accelerators," *Proceedings Of The* 39th *ACM SIGPLAN Conference On Programming Language Design And Implementation* (PLDI), Proceedings of the 43rd International Symposium on Computer Architecture, 2018.

FIGS. 7A, 7B, and 7C illustrate one example of partitioning the dataflow graph 206 into memory allocations 224 and execution fragments 222. In FIGS. 7A, 7B, and 7C, blue highlighted code identifies the memory allocations 224 and green highlighted code identifies the execution fragments 222. The first memory allocation 701 allocates memory spaces in on-chip SRAM for the input 602. The second memory allocation 702 allocates memory spaces in the on-chip SRAM for the convolution 612. The third memory allocation 703 allocates memory spaces in the on-chip SRAM for the output 614.

The first execution fragment 704 implements the convolution 612 between the input 602 and convolution weights of the convolution 612. The second execution fragment 705 implements accumulation of the output 614.

The fourth memory allocation 706 allocates memory spaces in the on-chip SRAM for the output 624 of the batch normalization 622. The fifth memory allocation 707 allocates memory spaces in the on-chip SRAM for the scaling value of the batch normalization 622. The sixth memory allocation 708 allocates memory spaces in the on-chip SRAM for the bias value of the batch normalization 622.

The third execution fragment 709 implements mean calculation 1302 of the batch normalization 622. The fourth execution fragment 710 implements mean normalization 1206 of the batch normalization 622.

In FIG. 7B, the fifth execution fragment 711 implements variance calculation 1304 of the batch normalization 622. The sixth execution fragment 712 implements variance normalization 1207 of the batch normalization 622. The seventh execution fragment 713 implements calculation of the output 624 of the batch normalization 622.

The seventh memory allocation 714 allocates memory spaces in the on-chip SRAM for the output 634 of the ReLU activation 632. The eighth execution fragment 715 implements calculation of the output 634 of the ReLU activation 632.

The eighth memory allocation 716 allocates memory spaces in the on-chip SRAM for the output 644 of the average pooling 642. The ninth execution fragment 717 implements calculation of the output 644 of the average pooling 642. The tenth execution fragment 718 implements accumulation of the output 644 of the average pooling 642.

In FIG. 7C, the ninth memory allocation 719 allocates memory spaces in the on-chip SRAM for the neurons (weights) of the linear layer 652. The tenth memory allocation 720 allocates memory spaces in the on-chip SRAM for the final output 654. The eleventh execution fragment 721 implements calculation of the final output 654.

Designation

Figure 8:
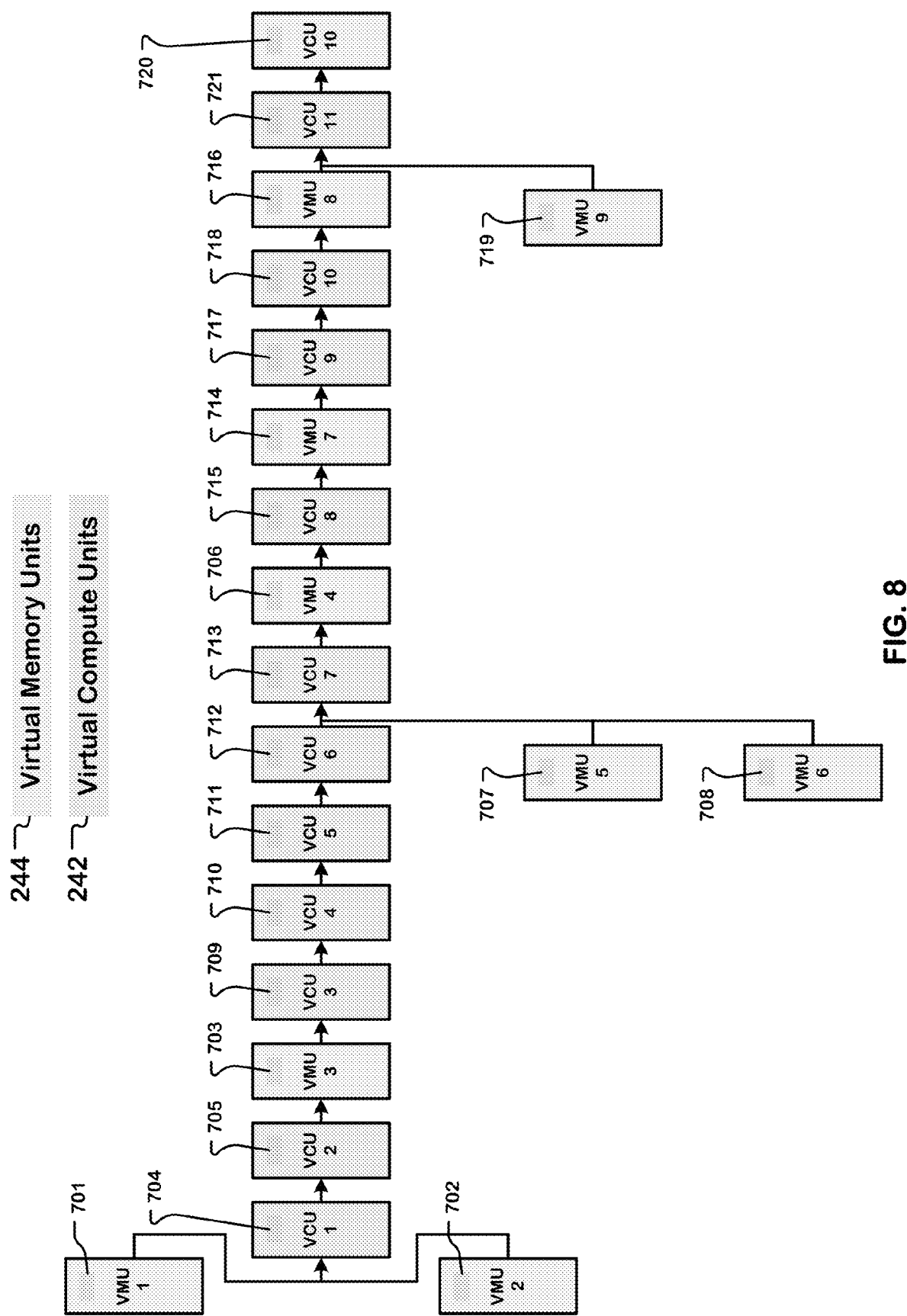
FIG. 8 is one implementation of designating the memory allocations to the virtual memory units and designating the execution fragments to the virtual compute units.

FIG. 8 shows an example of one implementation of designating the memory allocations 224 to the virtual memory units 244 and designating the execution fragments to the virtual compute units 242. In FIG. 8, the ten memory allocations 224 in FIGS. 7A, 7B, and 7C are respectively designated a corresponding virtual memory unit (VMU). Also in FIG. 8, the eleven execution fragments in FIGS. 7A, 7B, and 7C are respectively designated a corresponding virtual compute unit (VCU).

Execution Fragment Partitioning

Figures 9A, 9B:
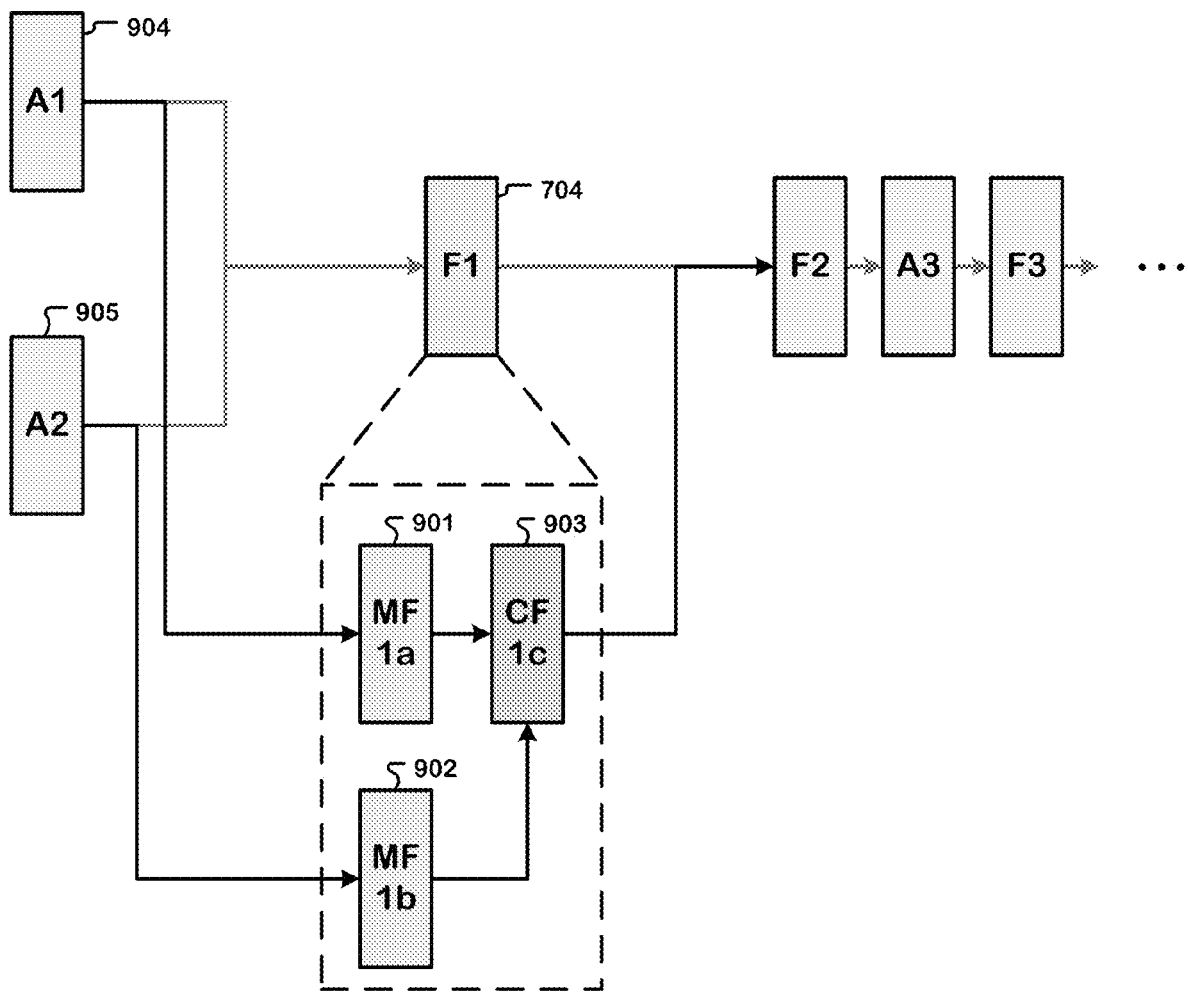
FIGS. 9A and 9B show one implementation of partitioning the execution fragments into memory fragments and compute fragments.

FIGS. 9A and 9B show one implementation of partitioning the execution fragments 222 into memory fragments 264 and compute fragments 262. FIG. 9A shows that the first execution fragment 704, which implements the convolution 612 between the input 602 and convolution weights of the convolution 612, is partitioned into a first memory fragment 901, a second memory fragment 902, and a compute fragment 903. FIG. 9B also shows the respective addresses computed by the first and second memory fragments 901, 902 (MF1a, MF1b) for memory access.

Figure 10:
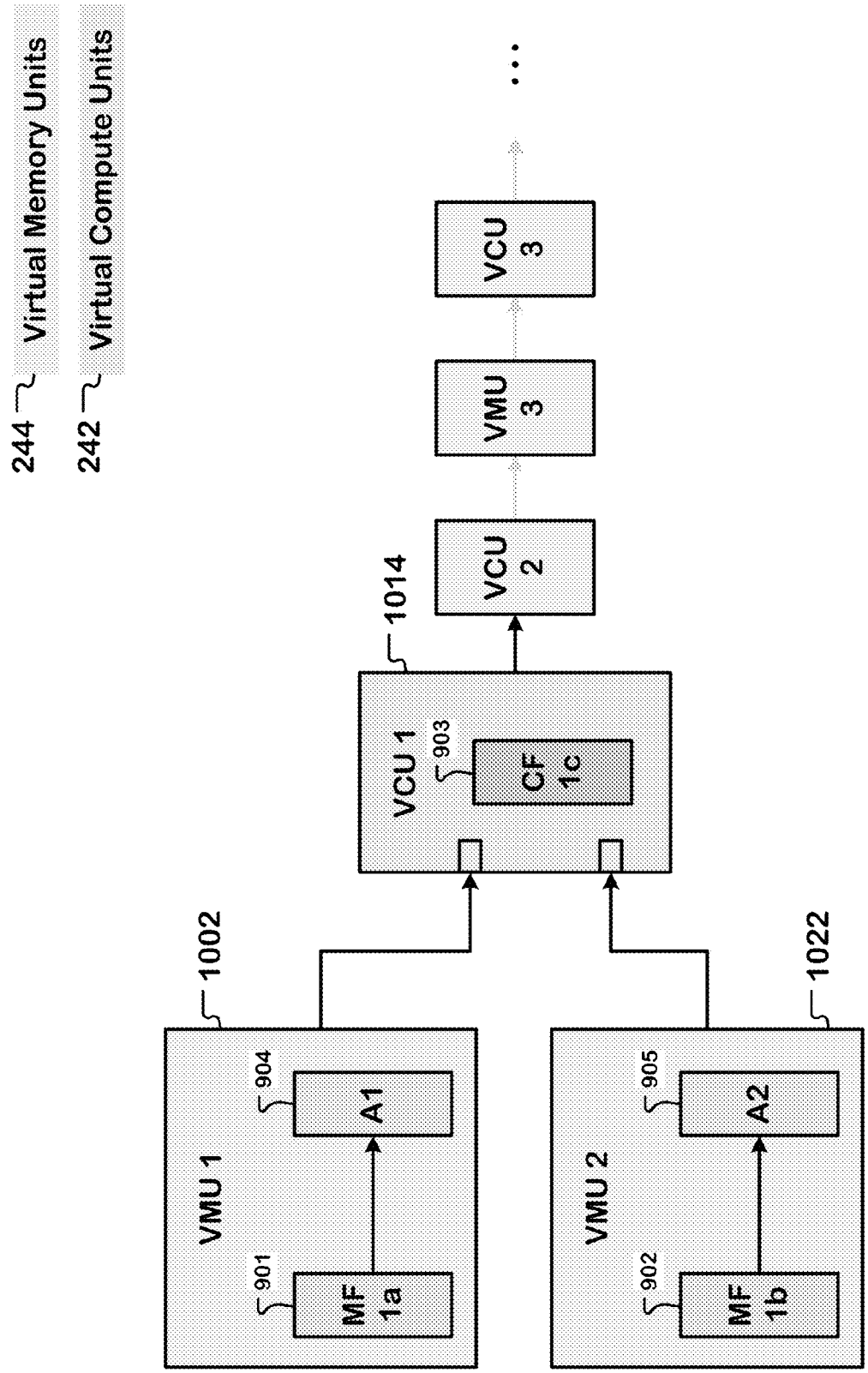
FIG. 10 depicts one implementation of respectively assigning the memory fragments to the virtual memory units and respectively assigning the compute fragments to the virtual compute units.

FIG. 10 depicts one implementation of respectively assigning the memory fragments 901, 902 to the virtual memory units 1002, 1022 (VMU_1, VMU_2) and assigning the compute fragment 903 to the virtual compute unit 1014 (VCU_1). The address calculation 901, 902 (MF1a, MF1b) are respectively allocated to the virtual memory units 1002, 1022 (VMU_1, VMU_2) with the allocations 904, 905 (A1, A2).

Figure 11:
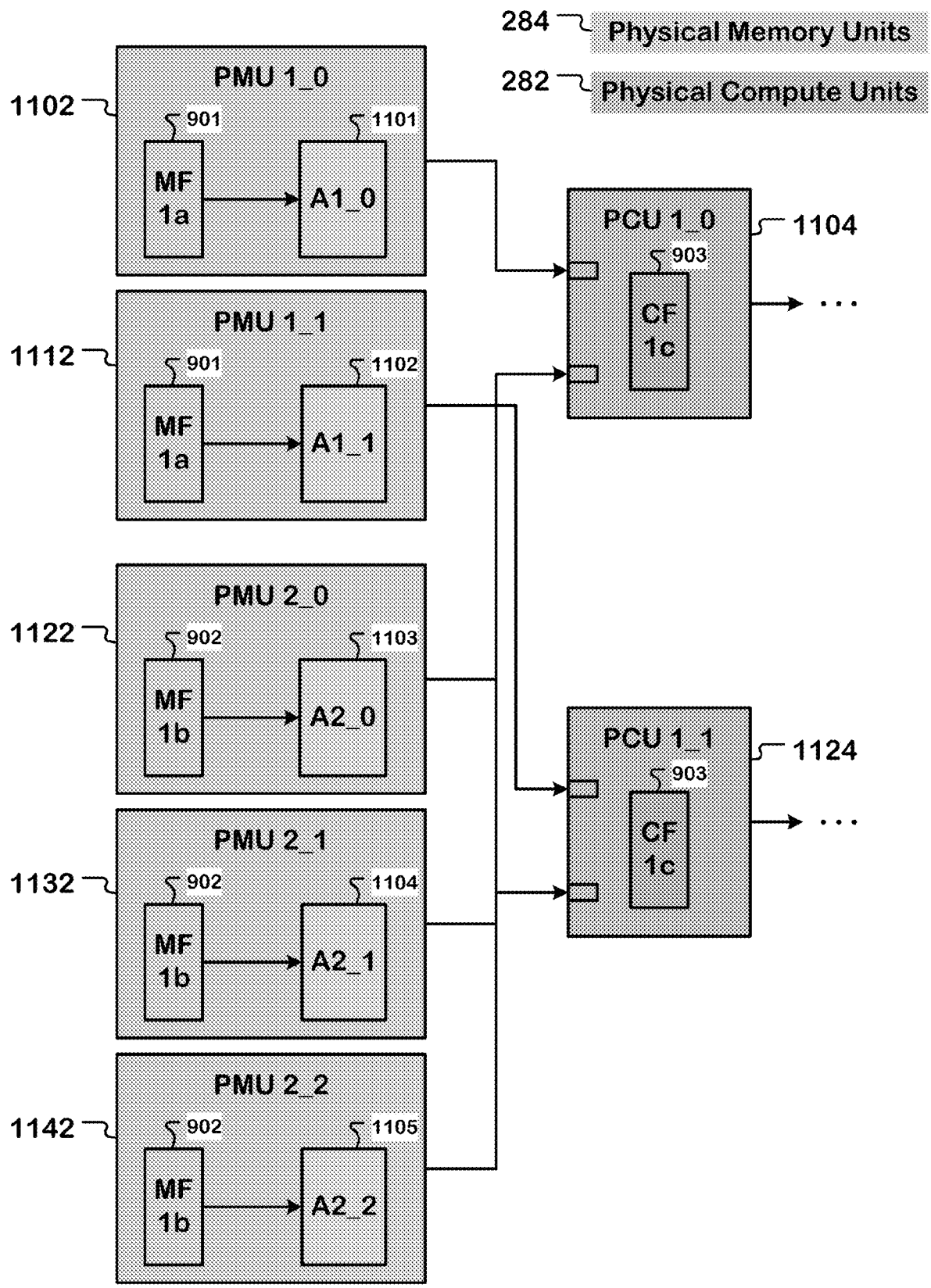
FIG. 11 illustrates one implementation of mapping the virtual memory units to one or more physical memory units and mapping the virtual compute units to one or more physical compute units.

FIG. 11 illustrates one implementation of mapping the virtual memory units 1002, 1022 (VMU_1, VMU_2) to one or more physical memory units 1102, 1112, 1122, 1132, 1142 (PMU 1_0, PMU 1_1, PMU 2_0, PMU 2_1, PMU 2_2) and mapping the virtual compute unit 1014 (VCU_1) to one or more physical compute units 1104, 1124 (PCU 1_0, PCU 1_1).

The virtual memory unit 1002 (VMU_1) is mapped to the physical memory unit 1102 (PMU 1_0) and the physical memory unit 1112 (PMU 1_1). The original address designation 904 (A1) of the virtual memory unit 1002 (VMU_1) is expressed as duplicated address designations 1101, 1102 (A1_0, A1_1) of the physical memory units 1102, 1112 (PMU 1_0, PMU 1_1), respectively.

The virtual memory unit 1022 (VMU_2) is mapped to the physical memory unit 1122 (PMU 2_0), the physical memory unit 1132 (PMU 2_1), and the physical memory unit 1142 (PMU 2_1). The original address designation 905 (A2) of the virtual memory unit 1022 (VMU 2) is expressed as duplicated address designations 1103, 1104, 1105 (A2_0, A2_1, A2_2) of the physical memory units 1122, 1132, 1142 (PMU 2_0, PMU 2_1, PMU 2_2), respectively.

The virtual compute unit 1014 (VCU_1) is mapped to the physical compute unit 1104 (PCU 1_0) and the physical compute unit 1124 (PCU 1_1).

Figures 12A, 12B:
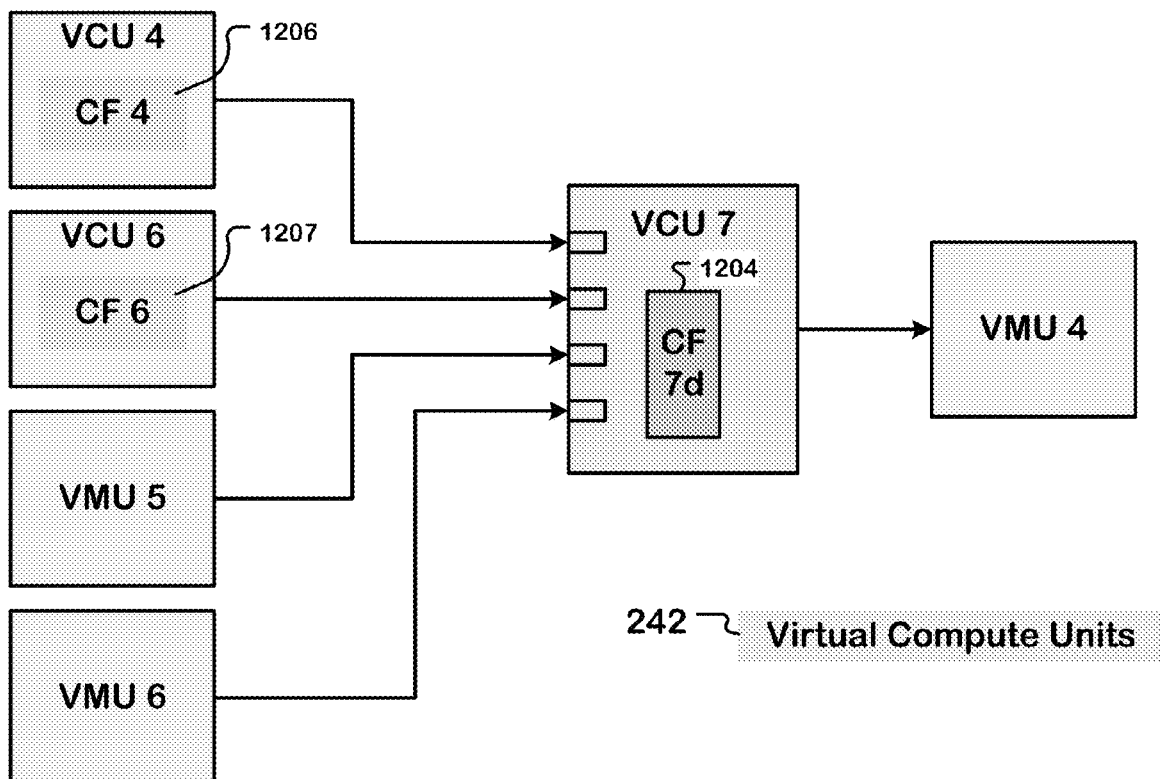
FIGS. 12A and 12B depict one example of mapping an execution fragment to a virtual compute unit.

FIGS. 12A and 12B depict one example of mapping execution fragment 713 to a virtual compute unit (VCU 7) that has four inputs. Execution fragment 713 is partitioned into a first memory fragment 1201, a second memory fragment 1202, a third memory fragment 1203, a fourth memory fragment 1205, and a compute fragment 1204.

In FIG. 12B, since the virtual compute unit (VCU 7) has four inputs, it is able to process all the four memory fragments 1201, 1202, 1203, 1205 to compute the compute fragment 1204 for the execution fragment 713.

When a single physical compute unit is not enough to execute an execution fragment mapped to a virtual compute and/or memory unit, then splitting can be used to map the virtual compute and/or memory unit to multiple physical compute and/or memory units. The multiple physical compute and/or memory units then together execute the execution fragment.

Figure 12C:
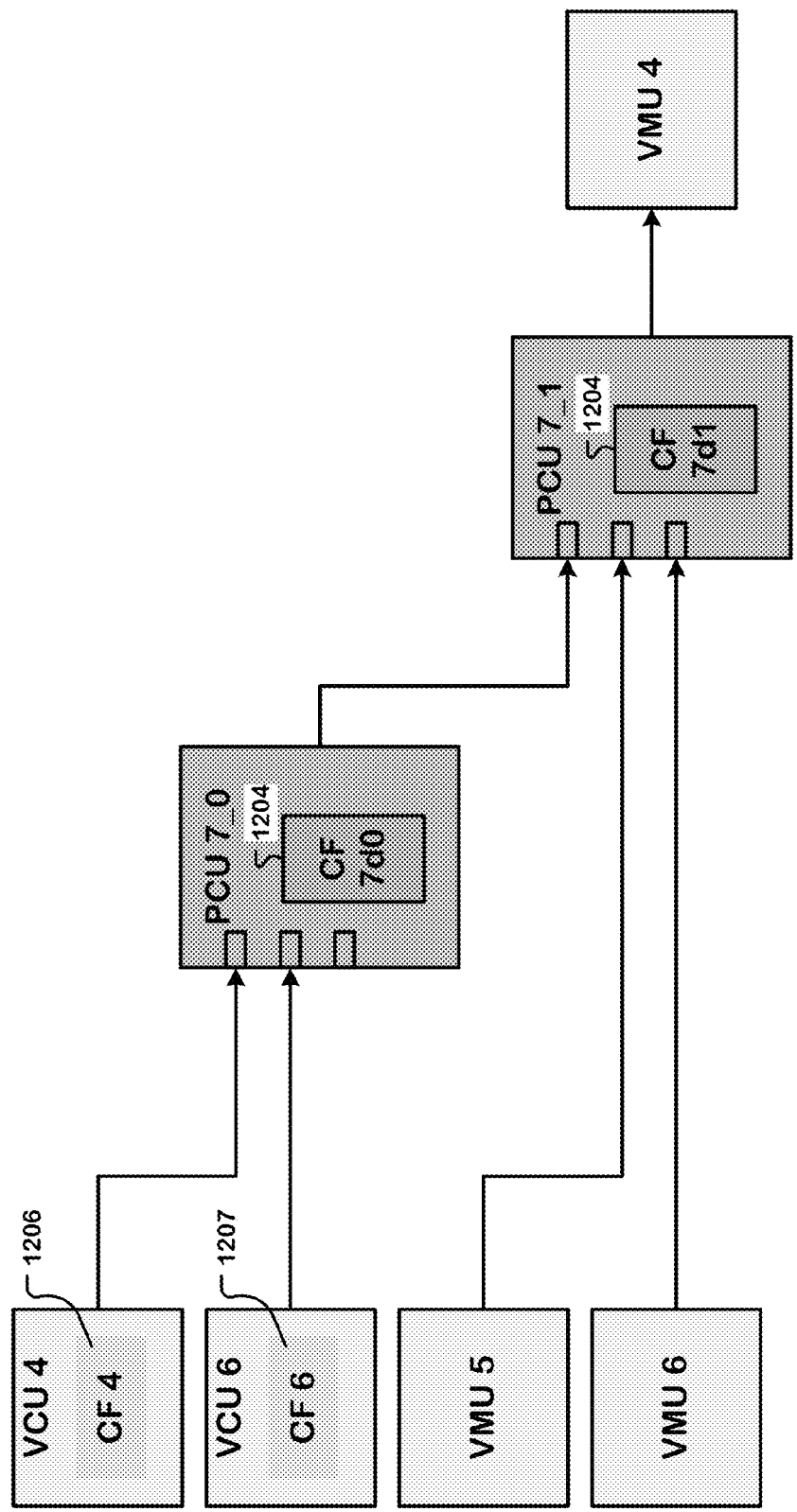
FIG. 12C shows that when a single physical compute unit is not enough to execute an execution fragment mapped to a virtual compute and/or memory unit, then splitting can be used to map the virtual compute and/or memory unit to multiple physical compute and/or memory units.

Turning to FIG. 12C, consider that a single physical compute unit has only three inputs. However though, the virtual compute unit (VCU 7) has four inputs. To account for this, two physical compute units (PCU 7_0 and PCU 7_1) are used to compute the compute fragment 1204 for the execution fragment 713. This is achieved by mapping the virtual compute unit (VCU 7) to the two physical compute units (PCU 7_0 and PCU 7_1).

Figure 13A:
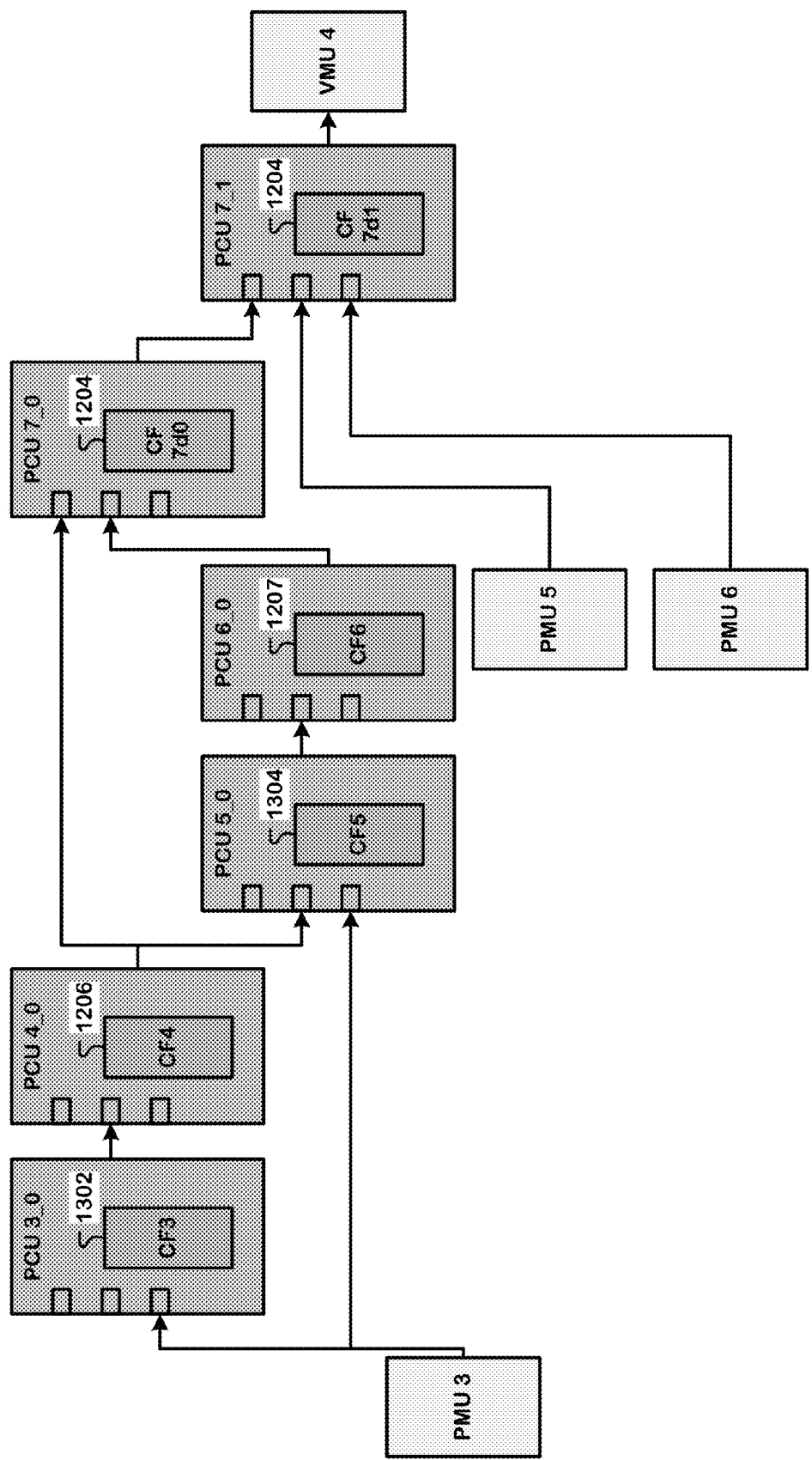
FIG. 13A is one example of fusing physical compute units and physical memory units.

FIG. 13A is one example of fusing physical compute units and physical memory units. In FIG. 13A, physical compute units and physical memory units implementing various memory fragments and compute fragments are connected. The connections follow data and control dependencies required by the dataflow graph 206.

Fusion in Space

Figure 13B:
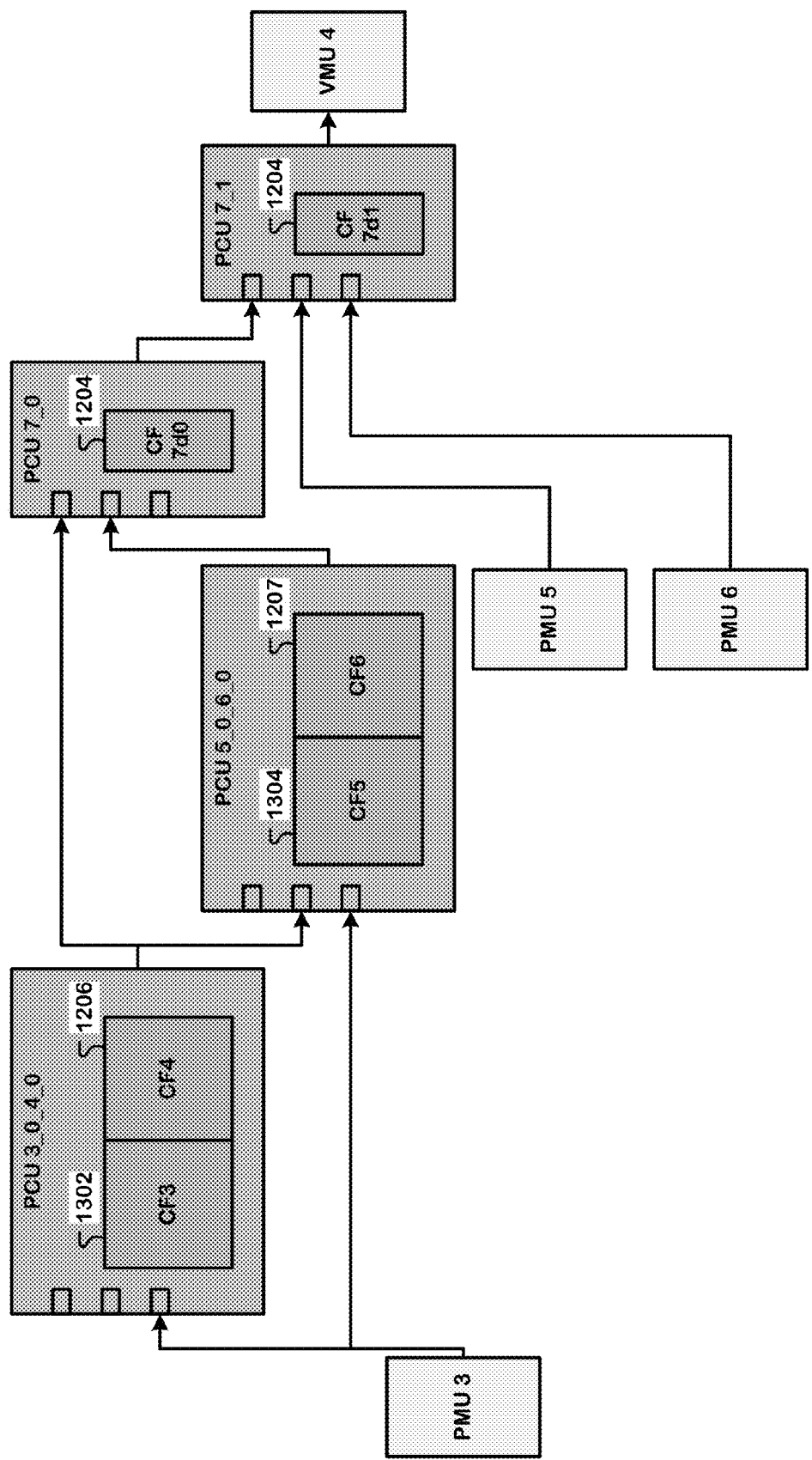
FIG. 13B illustrates one example of fusion in space by executing multiple operations on the single physical compute unit that would otherwise execute on separate physical compute units at different clock cycles.

FIG. 13B illustrates one example of fusion in space by executing multiple operations on the single physical compute unit that would otherwise execute on separate physical compute units at different clock cycles. In FIG. 13B, PCU 3_0 and PCU 4_0 are combined into a single PCU 3_0_4_0. Also, PCU 5_0 and PCU 6_0 are combined into a single PCU 5_0_6_0.

Fusion in Time

Figure 13C:
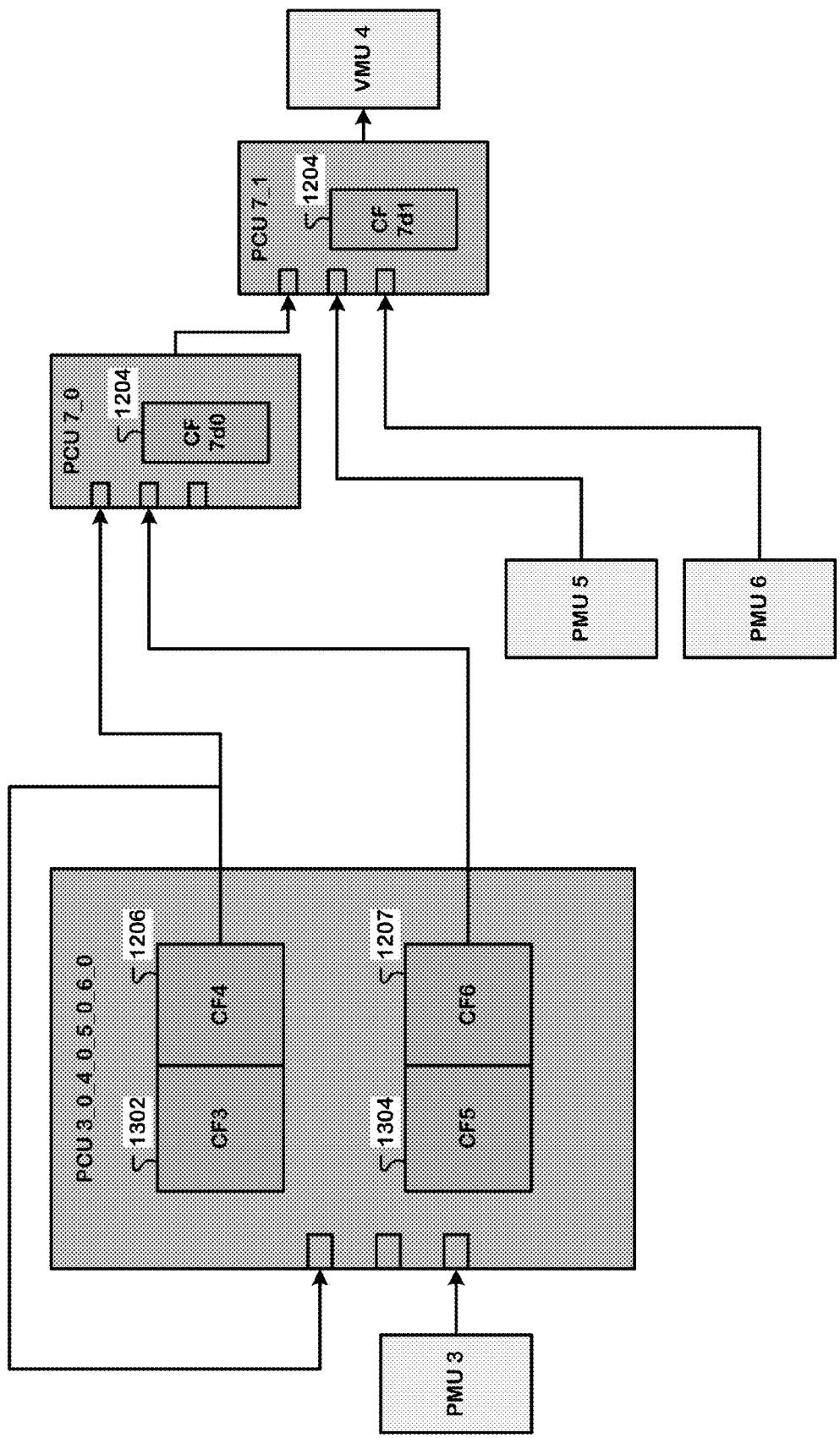
FIG. 13C shows one example of fusion in time by sequentially executing the multiple operations on the single physical compute unit as separate execution contexts.

FIG. 13C shows one example of fusion in time by sequentially executing the multiple operations on the single physical compute unit as separate execution contexts. In FIG. 13C, PCU 3_0, PCU 4_0, PCU 5_0, and PCU 6_0 are combined into a single PCU 3_0_4_0_5_0_6_0. This means the single PCU 3_0_4_0_5_0_6_0 executes the fused compute fragments 1302, 1206 (CF 3/4) for one segment of time, then changes contexts and executes the fused compute fragments 1304, 1207 (CF 5/6). The value after CF 3/4 is passed back to the unit (since it is an intermediate value used as an input to CF 5/6). The implementation of this self-loop depends on the hardware embodiment, but can be implemented as an internal register or memory in the PCU or using the external network by feeding the PCU's output back into itself. In another embodiment, the data fed back to the PCU can be stored in a separate memory unit such as a PMU or a set of PMUs.

Reconfigurable Tile

Figure 14B:
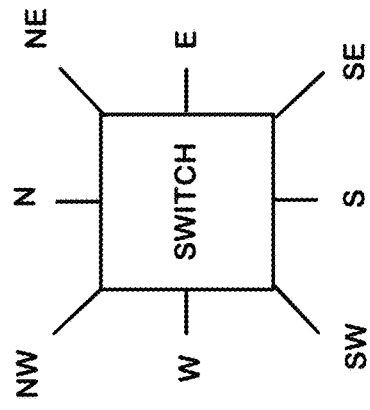
FIG. 14B illustrates an example switch unit connecting elements in the array level network.
Figure 14A:
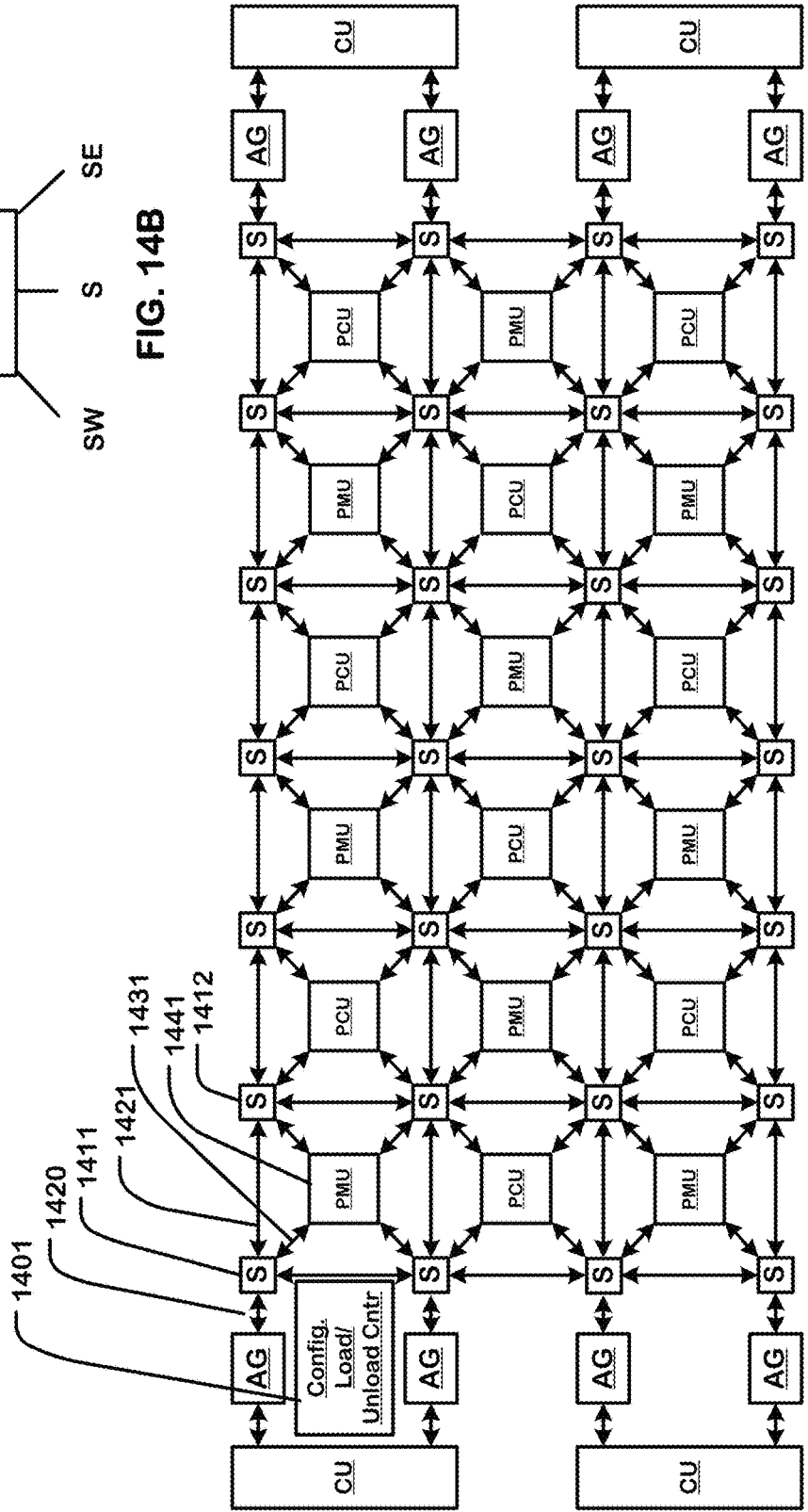
FIG. 14A is a simplified diagram of a tile and an array level network usable in the reconfigurable data processor of FIG. 1.

FIG. 14A is a simplified diagram 1400 of a tile and an array level network usable in the reconfigurable data processor of FIG. 1. FIG. 14B illustrates an example switch unit connecting elements in the array level network. In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, June 24-28, 2017, Toronto, ON, Canada, which is incorporated by reference as if fully set forth herein.

Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. The configuration file 198 contains a bitstream representing the initial configuration, or starting state, of each of the components that execute the program. This bitstream is referred to as a bit file. Program load is the process of setting up the configuration stores in the array 190 of configurable units based on the contents of the bit file to allow all the components to execute a program (i.e., a machine). Program Load may also require the load of all PMU memories.

The array level network includes links interconnecting configurable units in the array. The links in the array level network include one or more and, in this case three, kinds of physical buses: a chunk-level vector bus (e.g. 128 bits of data), a word-level scalar bus (e.g. 32 bits of data), and a multiple bit-level control bus. For instance, interconnect 1421 between switch units 1411 and 1412 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array 190 of configurable units.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can includes:

A bit to indicates if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 14B illustrates an example switch unit connecting elements in the array level network. As shown in the example of FIG. 14B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file 198, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1441 can be sent from the configuration load/unload controller 1401 to the PMU 1441, via a link 1420 between the configuration load/unload controller 1401 and the West (W) vector interface of the switch unit 1411, the switch unit 1411, and a link 1431 between the Southeast (SE) vector interface of the switch unit 1411 and the PMU 1441.

Figure 15:
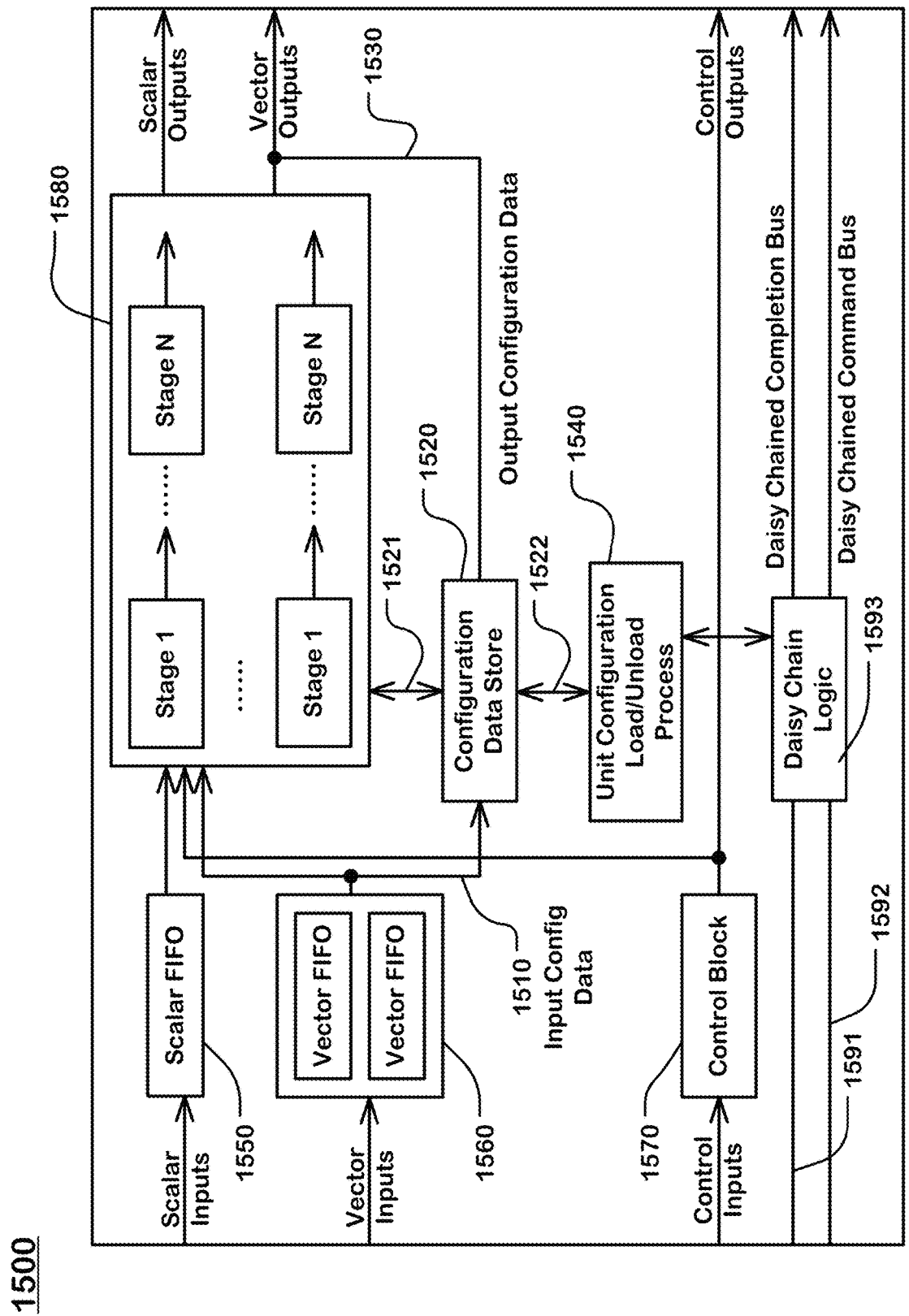
FIG. 15 is a block diagram illustrating an example configurable unit.

In this example, one of the AGCUs is configured to be a master AGCU, which includes a configuration load/unload controller (e.g. 1401). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 15). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions, and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit can use a coalescing cache to maintain metadata on issued off-chip memory requests to combine sparse addresses that belong to the same off-chip memory request to minimize the number of issued off-chip memory requests.

Reconfigurable Units

FIG. 15 is a block diagram illustrating an example configurable unit 1500, such as a Pattern Compute Unit (PCU). In the context of this application, a PCU corresponds to a physical compute unit. Configurable units in the array of configurable units include configuration data stores 1520 (e.g. serial chains) to store unit files comprising a plurality of chunks (or sub-files of other sizes) of configuration data particular to the corresponding configurable units. Configurable units in the array of configurable units each include unit configuration load logic 1540 connected to the configuration data store 1520 via line 1522, to execute a unit configuration load process. The unit configuration load process includes, receiving via the bus system (e.g. the vector inputs), chunks of a unit file particular to the configurable unit, and loading the received chunks into the configuration data store 1520 of the configurable unit.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

A configurable unit can interface with the scalar, vector, and control buses using three corresponding sets of inputs and outputs (IO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 1570, and control outputs are provided by the control block 1570.

Each vector input is buffered using a vector FIFO in a vector FIFO block 1560 which can include one or more vector FIFOs. Each scalar input is buffered using a scalar FIFO 1550. Using input FIFOs decouples timing between data producers and consumers, and simplifies inter-configurable-unit control logic by making it robust to input delay mismatches.

Input configuration data 1510 can be provided to a vector FIFO as vector inputs, and then be transferred to the configuration data store 1520. Output configuration data 1530 can be unloaded from the configuration data store 1520 using the vector outputs.

The CGRA uses a daisy chained completion bus to indicate when a load/unload command has been completed. The master AGCU transmits the program load and unload commands to configurable units in the array of configurable units over a daisy-chained command bus. As shown in the example of FIG. 15, a daisy chained completion bus 1591 and a daisy chained command bus 1592 are connected to daisy chain logic 1593, which communicates with the unit configuration load logic 1540. The daisy chain logic 1593 can include load complete status logic, as described below. The daisy chained completion bus is further described below. Other topologies for the command and completion buses are clearly possible but not described here.

A configurable unit includes multiple reconfigurable datapaths in block 1580. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 1580 via lines 1521.

In the context of this application, a pattern memory unit (PMU) corresponds to a physical memory unit. A PMU can contain scratchpad memory coupled with a reconfigurable datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU. Each PMU contains a programmer-managed scratchpad memory coupled with a reconfigurable datapath intended primarily for address calculation, and other compute operations as required by the program. PMUs are used to distribute on-chip memory throughout the array 190. The array architecture makes a distinction between the operations involved in memory addresses calculation and the core computation underlying applications. Address calculation is performed on the PMU datapath, while the core computation is performed within the PCU. Several observations have motivated this design choice: (i) address calculation involves simple scalar math, which requires simpler ALUs than the ALUs in PCUs; (ii) Using multiple lanes for address computation is often unnecessary for most on-chip access patterns; and (iii) Performing address calculation within the PCU requires routing the addresses from the PCU to the PMU, which occupies PCU stages and output links, and can lead to PCU under-utilization.

PCUs and PMUs (collectively "units") communicate with three kinds of interconnect: word-level scalar, multiple-word-level vector, and bit-level control interconnects. The array 190 of configurable units interfaces with DRAM through multiple DDR channels. Each channel has an associated address management unit that arbitrates between multiple address streams, and consists of buffers to support multiple outstanding memory requests and address coalescing to minimize DRAM accesses. Local address calculation is done in PMUs, DRAM address computation happens in the DRAM address management units, and the remaining data computation happens in PCUs. The scratchpads are built with multiple SRAM banks matching the number of PCU lanes. Address decoding logic around the scratchpad can be configured to operate in several banking modes to support various access patterns. Strided banking mode supports linear access patterns often found on dense data structures. FIFO mode supports streaming accesses. Line buffer mode captures access patterns resembling a sliding window. Duplication mode, where the contents are duplicated across all memory banks, provides multiple read address channels to support parallelized on-chip gather operations.

The PCU is designed to execute innermost parallel patterns in an application. The PCU datapath is organized as a multi-stage, reconfigurable SIMD pipeline. This design enables each PCU to achieve high compute density, and exploit both loop-level parallelism across lanes and pipeline parallelism across stages. Each stage of each SIMD lane is composed of a functional unit (FU) and associated pipeline registers (PR). FUs perform 32 bit word-level arithmetic and binary operations, including support for floating point and integer operations. As the FUs in a single pipeline stage operate in SIMD, each stage requires only a single configuration register. Results from each FU are written to its associated register. PRs in each lane are chained together across pipeline stages to allow live values propagate between stages within the same lane. Cross-lane communication between FUs is captured using two types of intra-PCU networks: a reduction tree network that allows reducing values from multiple lanes into a single scalar, and a shift network which allows using PRs as sliding windows across stages to exploit reuse in stencil applications. Both networks use dedicated registers within PRs to minimize hardware overhead.

PCUs interface with the global interconnect using three kinds of inputs and outputs (IO); scalar, vector, and control. Scalar IO is used to communicate single words of data, such as the results of Folds. Each vector IO allows communicating one word per lane in the PCU, and is used in cases such as reading and writing to scratchpads in PMUs and transmitting intermediate data across a long pipeline between multiple PCUs. Each vector and scalar input is buffered using a small FIFO. Using input FIFOs decouples data producers and consumers, and simplifies inter-PCU control logic by making it robust to input delay mismatches. Control IO is used to communicate control signals such as the start or end of execution of a PCU, or to indicate backpressure.

A reconfigurable chain of counters generates pattern iteration indices and control signals to coordinate execution. PCU execution begins when the control block enables one of the counters. Based on the application's control and data dependencies, the control block can be configured to combine multiple control signals from both local FIFOs and global control inputs to trigger PCU execution. The control block is implemented using reconfigurable combinational logic and programmable up-down counters for state machines.

Just as banking is important to feed multiple SIMD units to sustain compute throughput, N-buffering, or generalized double buffering, is just as important to support coarse-grained pipelines. As an example, the skip connections in ResNet, and the buffers that hold the outputs of each layer can be implemented using N-buffering. The PMU scratchpad can be configured to operate as an N-buffer with any of the banking modes described. N-buffers are implemented by partitioning the address space in each SRAM bank into N disjoint regions. Using write and read state information, an appropriate offset is added to each bank's local address to access the correct data.

A programmable counter chain and control block triggers PMU execution similar to the PCU. Each PMU typically contains write address calculation logic from the producer pattern, and read address calculation logic from the consumer pattern. Based on the state of the local FIFOs and external control inputs, the control block can be configured to trigger the write address computation, read address computation, or both, by enabling the appropriate counters.

Particular Implementations

In one implementation, we disclose a computer-implemented method of transforming a high-level program for mapping onto a reconfigurable data processor with an array of configurable units. The method includes partitioning a dataflow graph of the high-level program into memory allocations and execution fragments. The memory allocations represent creation of logical memory spaces in on-processor and/or off-processor memories for data required to implement the dataflow graph. The execution fragments represent operations on the data.

The method includes designating the memory allocations to virtual memory units and designating the execution fragments to virtual compute units.

The method includes partitioning the execution fragments into memory fragments and compute fragments.

The method includes assigning the memory fragments to the virtual memory units and assigning the compute fragments to the virtual compute units.

The method includes allocating the virtual memory units to physical memory units and allocating the virtual compute units to physical compute units.

The method includes placing the physical memory units and the physical compute units onto positions in the array of configurable units and routing data and control networks between the placed positions.

The method includes generating a bit file with configuration data for the placed positions and the routed data and control networks. The bit file, when loaded onto an instance of the array of configurable units, causes the array of configurable units to implement the dataflow graph.

Each of the features discussed in the particular implementation section for other implementations apply equally to this implementation. As indicated above, all the other features are not repeated here and should be considered repeated by reference. The reader will understand how features identified in these implementations can readily be combined with sets of base features identified in other implementations.

The method includes allocating at least one of the virtual memory units to multiple physical memory units and/or allocating at least one of the virtual compute units to multiple physical compute units.

The method includes placing the multiple physical memory units and the multiple physical compute units onto positions in the array of configurable units and routing data and control networks between the placed positions.

The method includes generating a bit file with configuration data for the placed positions and the routed data and control networks. The bit file, when loaded onto an instance of the array of configurable units, causes the array of configurable units to implement the dataflow graph.

The allocating satisfies hardware constraints of the multiple physical memory units and the multiple physical compute units. The allocating depends, at least in part, on a number of inputs accepted by a particular physical compute unit. The allocating depends, at least in part, on a capacity of on-chip SRAM available in a physical memory unit, a number of arithmetic logic unit (ALU) stages, a number of registers per stage, capabilities of each ALU stage, connections available between ALUs and the registers, and connections available between the registers.

The method includes fusing at least two of the physical memory units into a single physical memory unit and/or fusing at least two of the physical compute units into a single physical compute unit.

The method includes placing the single physical memory unit and the single physical compute unit onto positions in the array of configurable units and routing data and control networks between the placed positions.

The method includes generating a bit file with configuration data for the placed positions and the routed data and control networks. The bit file, when loaded onto an instance of the array of configurable units, causes the array of configurable units to implement the dataflow graph.

The fusion increases utilization of resources of the single physical memory unit and the single physical compute unit. The fusing depends, at least in part, on a number of ALU stages within the single physical compute unit. The fusion in space includes executing multiple operations on the single physical compute unit that would otherwise execute on separate physical compute units at different clock cycles. The fusion in time includes sequentially executing the multiple operations on the single physical compute unit as separate execution contexts. The execution fragments are executable asynchronously.

The method includes configuring the memory fragments of the execution fragments to index into data structures. At least one of the memory fragments indexes into a data structure in the logical memory spaces of one of the memory allocations. At least one of the execution fragments includes a loop or pattern iterator that causes operations to at least one of the compute fragments to operate repeatedly over values indexed by the memory fragment. The compute fragment and the memory fragment of a particular execution fragment cause the operations to operate over at least two dimensions of a data structure holding the values indexed. A particular execution fragment includes multiple memory fragments that index into multiple data structures.

The partitioning into the execution fragments further includes treating calculations within at least one inner-most loop of a nested loop of the dataflow graph as a separate execution fragment. The partitioning into the execution fragments further includes treating calculations of an outer loop around the inner-most loop of the dataflow graph as a separate execution fragment.

The method includes mapping a plurality of operations from the dataflow graph that are grouped onto a particular physical compute unit onto resources within the particular physical compute unit.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In one implementation, we disclose a computer-implemented method of transforming a high-level program for mapping onto a reconfigurable data processor with an array of configurable units.

The method includes partitioning a dataflow graph of the high-level program into memory allocations and execution fragments. The memory allocations represent creation of logical memory spaces in on-processor and/or off-processor memories for data required to implement the dataflow graph. The execution fragments represent operations on the data.

The method includes designating the memory allocations and the execution fragments to virtual configurable units.

The method includes partitioning the execution fragments into memory fragments and compute fragments.

The method includes assigning the memory fragments and the compute fragments to the virtual configurable units.

The method includes allocating the virtual configurable units to physical configurable units.

The method includes placing the physical configurable units onto positions in the array of configurable units and routing data and control networks between the placed positions.

The method includes generating a bit file with configuration data for the placed positions and the routed data and control networks. The bit file, when loaded onto an instance of the array of configurable units, causes the array of configurable units to implement the dataflow graph.

Each of the features discussed in the particular implementation section for other implementations apply equally to this implementation. As indicated above, all the other features are not repeated here and should be considered repeated by reference. The reader will understand how features identified in these implementations can readily be combined with sets of base features identified in other implementations.

The method includes allocating at least one of the virtual configurable units to multiple physical configurable units.

The method includes placing the multiple physical configurable units onto positions in the array of configurable units and routing data and control networks between the placed positions.

The method includes generating a bit file with configuration data for the placed positions and the routed data and control networks. The bit file, when loaded onto an instance of the array of configurable units, causes the array of configurable units to implement the dataflow graph.

The method includes fusing at least two of the physical configurable units into a single physical configurable unit.

The method includes placing the single physical configurable unit onto positions in the array of configurable units and routing data and control networks between the placed positions.

The method includes generating a bit file with configuration data for the placed positions and the routed data and control networks. The bit file, when loaded onto an instance of the array of configurable units, causes the array of configurable units to implement the dataflow graph.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented method of transforming a high-level program for mapping onto a reconfigurable data processor with an array of configurable units, the method including:
    partitioning a dataflow graph of the high-level program into memory allocations and execution fragments, wherein the memory allocations represent creation of logical memory spaces in one or more memories for data to implement the dataflow graph, and the execution fragments represent operations on the data, including loading the data from allocated memory and computing with the data;
    partitioning the execution fragments into (i) memory fragments that load the data from the allocated memory and (ii) compute fragments that compute with the data;
    assigning the memory fragments to virtual memory units and assigning the compute fragments to virtual compute units;
    allocating the virtual memory units to physical memory units, including allocating a first one of the virtual memory units to multiple physical memory units;
    allocating the virtual compute units to physical compute units; and
    generating a bit file with configuration data, based at least in part on the memory allocations, the memory fragments, and the compute fragments,
    wherein the bit file, when loaded onto an instance of the array of configurable units, causes the array of configurable units to implement the dataflow graph.

2. The method of claim 1, further comprising:
    placing the physical memory units and the physical compute units onto positions in the array of configurable units and routing data and control networks between the placed positions.

3. The method of claim 2, wherein the bit file includes the configuration data for the placed positions and the routed data and control networks.

4. The method of claim 1, wherein allocating the virtual compute units to physical compute units comprises:
    allocating a first one of the virtual compute units to multiple physical compute units.

5. The method of claim 1, further comprising:
    designating the memory allocations to virtual memory units.

6. The method of claim 1, wherein the execution fragments are executable asynchronously.

7. The method of claim 1, wherein a first execution fragment is partitioned into one or more corresponding memory fragments and exactly one corresponding compute fragment.

8. The non-transitory computer readable storage medium of claim 1, the method further comprising:
    placing the physical memory units and the physical compute units onto positions in the array of configurable units and routing data and control networks between the placed positions, wherein the bit file includes the configuration data for the placed positions and the routed data and control networks.

9. The non-transitory computer readable storage medium of claim 1, wherein allocating the virtual memory units to physical memory units comprises:
    allocating a first one of the virtual memory units to multiple physical memory units.

10. The non-transitory computer readable storage medium of claim 1, wherein a first execution fragment is partitioned into one or more corresponding memory fragments and exactly one corresponding compute fragment.

11. A computer-implemented method comprising:
    generating, from a dataflow graph of a high-level program, (i) memory fragments that load the data from the allocated memory and (ii) compute fragments that compute with the data;
    assigning the memory fragments to the virtual memory units and assigning the compute fragments to the virtual compute units;
    allocating the virtual memory units to physical memory units and allocating the virtual compute units to physical compute units, including assigning a first virtual compute unit to a first physical compute unit and assigning a second virtual compute unit to a second physical compute unit, wherein the first compute memory unit is separate from the second physical compute unit;
    fusing the first physical compute unit and the second physical compute unit into a single physical compute unit; and
    generating a bit file with configuration data, based at least in part of the fusing, wherein the bit file, when loaded onto an instance of an array of configurable units, causes the array of configurable units to implement the dataflow graph.

12. The method of claim 11, further comprising:
    placing the physical memory units and the physical compute units, including the single physical compute unit, onto positions in the array of configurable units and routing data and control networks between the placed positions,
    wherein the bit file includes the configuration data for the placed positions and the routed data and control networks.

13. The method of claim 11, further comprising:
    further generating, from the dataflow graph of the high-level program, memory allocations that represent creation of logical memory spaces in one or more memories for data to implement the dataflow graph.

14. The method of claim 11, wherein fusing at least two of the physical compute units into the single physical compute unit comprises:
   causing execution of multiple operations on the single physical compute unit that would otherwise execute on the at least two of the physical compute units, wherein fusing is a fusing in space.

15. The method of claim 11, wherein fusing at least two of the physical compute units into the single physical compute unit comprises:
   causing sequential execution of multiple operations on the single physical compute unit as separate execution contexts, wherein fusing is a fusing in time.

16. The method of claim 11, further comprising: fusing at least two of the physical memory units into a single physical memory unit,
   causing execution of multiple memory operations on the single physical memory unit that would otherwise execute on the at least two of the physical memory units, wherein fusing is a fusing in space.

17. The method of claim 11, further comprising: fusing at least two of the physical memory units into a single physical memory unit,
   causing sequential execution of multiple memory operations on the single physical memory unit as separate execution contexts, wherein fusing is a fusing in time.

18. The method of claim 11, wherein the fusing is based, at least in part, on a number of arithmetic logic unit (ALU) stages within the single physical compute unit.

19. A system including one or more processors coupled to memory, the memory loaded with computer instructions to transform a high-level program for mapping onto a reconfigurable data processor with an array of configurable units, the instructions, when executed on the processors, implement actions comprising:
   generating, from a dataflow graph of a high-level program, (i) memory fragments that load the data from the allocated memory and (ii) compute fragments that compute with the data;
   assigning the memory fragments to the virtual memory units and assigning the compute fragments to the virtual compute units;
   mapping (i) the virtual memory units to physical memory units and (ii) the virtual compute units to physical compute units, wherein the mapping comprises
      mapping (i) a first one of the virtual memory units to multiple physical memory units, and/or (ii) a first one of the virtual compute units to multiple compute units;
   placing the physical memory units and the physical compute units onto positions in the array of configurable units, and routing data and control networks between the placed positions; and
   generating a bit file with configuration data for the placed positions and the routed data and control networks, wherein the bit file, when loaded onto an instance of the array of configurable units, causes the array of configurable units to implement the dataflow graph.

20. The system of claim 19, wherein the actions further comprise:
   further generating, from the dataflow graph of the high-level program, memory allocations representing creation of logical memory spaces in one or more memories for data to implement the dataflow graph.

21. The system of claim 19, wherein generating the memory fragments and the compute fragments comprise:
   partitioning the dataflow graph of the high-level program into memory allocations and execution fragments, wherein the memory allocations represent creation of logical memory spaces in one or more memories for data to implement the dataflow graph, and the execution fragments represent operations on the data, including loading the data from allocated memory and computing with the data; and
   partitioning the execution fragments into the memory fragments and the compute fragments.

22. The system of claim 19, wherein the execution fragments are executable asynchronously, and wherein a first execution fragment is fragmented into one or more corresponding memory fragments and exactly one corresponding compute fragment.

23. A non-transitory computer readable storage medium impressed with computer program instructions to transform a high-level program for mapping onto a reconfigurable data processor with an array of configurable units, the instructions, when executed on a processor, implement a method comprising:
   partitioning a dataflow graph of the high-level program into memory allocations and execution fragments, wherein the memory allocations represent creation of logical memory spaces in one or more memories for data to implement the dataflow graph, and the execution fragments represent loading the data from allocated memory and computing with the data;
   partitioning the execution fragments into (i) memory fragments that load the data from the allocated memory and (ii) compute fragments that compute with the data;
   assigning the memory fragments to virtual memory units and assigning the compute fragments to virtual compute units;
   allocating the virtual memory units to physical memory units;
   allocating the virtual compute units to physical compute units, including allocating a first one of the virtual compute units to multiple physical compute units; and
   generating a bit file with configuration data, based at least in part on the partitioning, wherein the bit file, when loaded onto an instance of the array of configurable units, causes the array of configurable units to implement the dataflow graph.

* * * * *